US010740358B2

(12) United States Patent
Chan et al.

(10) Patent No.: US 10,740,358 B2
(45) Date of Patent: Aug. 11, 2020

(54) KNOWLEDGE-INTENSIVE DATA PROCESSING SYSTEM

(71) Applicant: Oracle International Corporation, Redwood Shores, CA (US)

(72) Inventors: Eric S. Chan, Fremont, CA (US); Dieter Gawlick, Palo Alto, CA (US); Adel Ghoneimy, Hillsborough, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 65 days.

(21) Appl. No.: 14/665,171

(22) Filed: Mar. 23, 2015

(65) Prior Publication Data

US 2015/0254330 A1 Sep. 10, 2015

Related U.S. Application Data

(63) Continuation-in-part of application No. 14/109,651, filed on Dec. 17, 2013, now Pat. No. 9,330,119.
(Continued)

(51) Int. Cl.
*G06F 16/28* (2019.01)
*G06F 16/27* (2019.01)
(Continued)

(52) U.S. Cl.
CPC ........ *G06F 16/285* (2019.01); *G06F 11/3006* (2013.01); *G06F 11/3442* (2013.01);
(Continued)

(58) Field of Classification Search
USPC ....................................................... 707/740
See application file for complete search history.

(56) References Cited

U.S. PATENT DOCUMENTS 6,167,535 A 12/2000 Foote et al.
6,560,773 B1 5/2003 Alexander, III et al.
(Continued)

FOREIGN PATENT DOCUMENTS

CN 201000563 1/2008
CN 101263499 9/2008
(Continued)

OTHER PUBLICATIONS

Liu et al—Zhen Hua Liu, Andreas Behrend, Eric Chan, Dieter Gawlick, and Adel Ghoneimy, "KIDS—A Model for Developing Evolutionary Database Applications", Proceedings of the International Conference on Data Technologies and Applications, Jul. 1, 2012 (Jul. 1, 2012), pp. 129-134.*

(Continued)

*Primary Examiner* — Alford W Kindred
*Assistant Examiner* — Allen S Lin
(74) *Attorney, Agent, or Firm* — Kilpatrick Townsend & Stockton LLP

(57) ABSTRACT

Embodiments of the invention provide systems and methods for managing and processing large amounts of complex and high-velocity data by capturing and extracting high-value data from low value data using big data and related technologies. Illustrative database systems described herein may collect and process data while extracting or generating high-value data. The high-value data may be handled by databases providing functions such as multi-temporality, provenance, flashback, and registered queries. In some examples, computing models and system may be implemented to combine knowledge and process management aspects with the near real-time data processing frameworks in a data-driven situation aware computing system.

20 Claims, 19 Drawing Sheets

Related U.S. Application Data

(60) Provisional application No. 62/023,721, filed on Jul. 11, 2014, provisional application No. 61/969,005, filed on Mar. 21, 2014, provisional application No. 61/885,424, filed on Oct. 1, 2013, provisional application No. 61/811,106, filed on Apr. 11, 2013, provisional application No. 61/811,102, filed on Apr. 11, 2013.

(51) Int. Cl.
| | |
|---|---|
| *G06F 16/9535* | (2019.01) |
| *G06F 11/30* | (2006.01) |
| *G06F 11/34* | (2006.01) |
| *G06F 16/21* | (2019.01) |

(52) U.S. Cl.
CPC ......... *G06F 16/219* (2019.01); *G06F 16/273* (2019.01); *G06F 16/9535* (2019.01); *G06F 11/3452* (2013.01); *G06F 11/3466* (2013.01); *G06F 2201/84* (2013.01); *G06F 2201/865* (2013.01)

(56) References Cited

U.S. PATENT DOCUMENTS

| | | |
|---|---|---|
| 6,968,557 B1 | 11/2005 | Zhang et al. |
| 7,100,079 B2 | 8/2006 | Gross et al. |
| 7,257,657 B2 | 8/2007 | DeWitt, Jr. et al. |
| 7,526,682 B1 | 4/2009 | Chacko et al. |
| 7,685,575 B1 | 3/2010 | Fareed |
| 7,703,087 B1 | 4/2010 | Prakash |
| 7,735,074 B2 | 6/2010 | Lobo et al. |
| 7,991,961 B1 | 8/2011 | Tsai et al. |
| 8,407,798 B1* | 3/2013 | Lotem .................. G06F 21/55 726/18 |
| 8,464,255 B2 | 6/2013 | Nathuji et al. |
| 8,719,791 B1 | 5/2014 | MacPherson et al. |
| 8,832,490 B2 | 9/2014 | Malnati |
| 8,978,022 B2 | 3/2015 | Kalogeropulos et al. |
| 9,104,563 B2 | 8/2015 | Taskov |
| 9,146,862 B2 | 9/2015 | Bobroff et al. |
| 9,210,181 B1 | 12/2015 | Nandy et al. |
| 9,330,119 B2 | 5/2016 | Chan et al. |
| 9,471,225 B2 | 10/2016 | Bobroff et al. |
| 9,495,395 B2 | 11/2016 | Chan et al. |
| 9,600,394 B2 | 3/2017 | Salunke et al. |
| 9,692,662 B2 | 6/2017 | Chan et al. |
| 9,720,823 B2 | 8/2017 | Urmanov et al. |
| 2003/0005414 A1 | 1/2003 | Elliott et al. |
| 2003/0097617 A1 | 5/2003 | Goeller et al. |
| 2004/0059719 A1* | 3/2004 | Gupta ............... G06F 17/30457 |
| 2004/0111708 A1 | 6/2004 | Calder et al. |
| 2005/0091644 A1 | 4/2005 | Chilimbi |
| 2006/0122965 A1* | 6/2006 | Adams .............. G06F 17/30386 |
| 2006/0168475 A1 | 7/2006 | Segers et al. |
| 2006/0173877 A1 | 8/2006 | Findeisen et al. |
| 2006/0206885 A1 | 9/2006 | Seidman et al. |
| 2006/0218543 A1 | 9/2006 | Boger |
| 2007/0055914 A1 | 3/2007 | Chandwani et al. |
| 2007/0067758 A1 | 3/2007 | Findeisen et al. |
| 2007/0136402 A1 | 6/2007 | Grose et al. |
| 2007/0168915 A1 | 7/2007 | Fabbio et al. |
| 2007/0220513 A1 | 9/2007 | Hwang |
| 2007/0234296 A1 | 10/2007 | Zorn et al. |
| 2008/0148180 A1 | 6/2008 | Liu et al. |
| 2008/0301501 A1 | 12/2008 | Grant et al. |
| 2008/0301504 A1 | 12/2008 | Chen et al. |
| 2009/0037687 A1 | 2/2009 | Li et al. |
| 2009/0070776 A1 | 3/2009 | Dahlstedt |
| 2009/0106178 A1 | 4/2009 | Chu |
| 2009/0106603 A1 | 4/2009 | Dilman et al. |
| 2009/0177692 A1 | 7/2009 | Chagoly et al. |
| 2009/0234899 A1 | 9/2009 | Kramer |
| 2009/0320021 A1 | 12/2009 | Pan et al. |
| 2010/0094592 A1 | 4/2010 | Cherkasova et al. |
| 2010/0094992 A1 | 4/2010 | Cherkasova et al. |
| 2010/0235815 A1 | 9/2010 | Maybee et al. |
| 2010/0324869 A1 | 12/2010 | Cherkasova et al. |
| 2011/0016357 A1 | 1/2011 | Tsvetkov |
| 2011/0067007 A1 | 3/2011 | Zamarreno |
| 2011/0107050 A1 | 5/2011 | Vengerov |
| 2011/0258604 A1 | 10/2011 | Drukman et al. |
| 2011/0276949 A1 | 11/2011 | Otenko |
| 2011/0283266 A1 | 11/2011 | Gallagher et al. |
| 2011/0320586 A1 | 12/2011 | Maltz et al. |
| 2012/0144374 A1 | 6/2012 | Gallagher et al. |
| 2012/0159449 A1 | 6/2012 | Arnold et al. |
| 2012/0185732 A1 | 7/2012 | Sankar et al. |
| 2012/0185735 A1 | 7/2012 | Sambamurthy et al. |
| 2012/0185736 A1 | 7/2012 | Sambamurthy et al. |
| 2012/0197626 A1 | 8/2012 | Kejariwal et al. |
| 2012/0197733 A1* | 8/2012 | Skomoroch ............ G06Q 30/02 705/14.66 |
| 2013/0013953 A1 | 1/2013 | Eck et al. |
| 2013/0042154 A1 | 2/2013 | Agarwal et al. |
| 2013/0066866 A1* | 3/2013 | Chan ................. G06F 17/30699 707/732 |
| 2014/0143759 A1 | 5/2014 | Neichev et al. |
| 2014/0310235 A1 | 10/2014 | Chan et al. |
| 2014/0310285 A1 | 10/2014 | Chan et al. |
| 2014/0310714 A1 | 10/2014 | Chan et al. |
| 2015/0234869 A1 | 8/2015 | Chan et al. |
| 2016/0098341 A1 | 4/2016 | Pho et al. |
| 2016/0371170 A1 | 12/2016 | Salunke et al. |
| 2016/0371180 A1 | 12/2016 | Urmanov et al. |
| 2016/0371181 A1 | 12/2016 | Garvey et al. |
| 2017/0012834 A1 | 1/2017 | Chan et al. |
| 2017/0052730 A1 | 2/2017 | Bobroff et al. |
| 2017/0322861 A1 | 11/2017 | Chan |
| 2017/0322877 A1 | 11/2017 | Chan |
| 2017/0337085 A1 | 11/2017 | Chan |
| 2018/0074854 A1 | 3/2018 | Chan |

FOREIGN PATENT DOCUMENTS

| | | |
|---|---|---|
| CN | 101630285 | 1/2010 |
| CN | 105144112 | 12/2015 |
| CN | 105190564 | 12/2015 |
| CN | 107430613 | 12/2017 |
| CN | 105190564 | 3/2018 |
| EP | 1 696 351 A1 | 8/2006 |
| EP | 2984567 | 2/2016 |
| EP | 2984568 | 2/2016 |
| EP | 2984568 B1 | 9/2017 |
| EP | 3274869 | 1/2018 |
| JP | 08147396 A | 6/1995 |
| JP | 2002140774 A | 11/2000 |
| JP | 2007286811 | 11/2007 |
| JP | 2008305085 A | 12/2008 |
| JP | 2010198579 | 9/2010 |
| JP | 2011154483 | 8/2011 |
| JP | 2011192097 | 9/2011 |
| JP | 2014021585 A | 7/2012 |
| JP | 2016-517984 | 6/2016 |
| WO | 2012056569 A1 | 5/2012 |
| WO | 2014/168981 A1 | 10/2014 |
| WO | 2014/169056 A1 | 10/2014 |
| WO | 2017196743 | 11/2017 |
| WO | 2017196746 | 11/2017 |
| WO | 2017196748 | 11/2017 |
| WO | 2017196749 | 11/2017 |

OTHER PUBLICATIONS

Dieter Gawlick Oracle Corporation et al: "Fine Grain Provenance Using Temporal Databases", USENIX,, May 24, 2011 (May 24, 2011), pp. 1-4.*
U.S. Appl. No. 14/109,546.
U.S. Appl. No. 14/109,578, Feb. 1, 2016, Non-Final Office Action.
U.S. Appl. No. 14/705,304.

(56) References Cited

OTHER PUBLICATIONS

Ignacio Laguna Peralta; Perdue Univertisy, "Probabilistic error detection and diagnosis in large-scale distributed applications", Dec. 2012 (Peralta_2012.pdf; pp. 1-197).
Non-Final Office Action dated Jan. 28, 2016 for U.S. Appl. No. 14/109,578, all pages.
Chan et al., Situation aware computing for big data, IEEE International Conference on Big Data (Big Data), IEEE, Oct. 27, 2014, pp. 1-6.
Gawlick et al., Fine Grain Provenance Using Temporal Databases, Usinex,, May 24, 2011, pp. 1-4.
Gawlick, Mastering Situation Awareness: The Next Frontier?, 7th Biennial Conference on Innovative Data Systems Research (CIDR '15), Jan. 4-7, 2015, 1 page.
Guerra et al., An Integrated Data Management Approach to Manage Health Care Data, Datenbanken und Informationssysteme, (DBIS), Jan. 1, 2011, pp. 596-605.
Liu et al., KIDS—A Model for Developing Evolutionary Database Applications, Proceedings of the International Conference on Data Technologies and Applications,, Jul. 1, 2012, pp. 129-134.
International Application No. PCT/US2014/033530, International Preliminary Report on Patentability dated Jul. 13, 2015, 6 pages.
International Application No. PCT/US2014/033385, International Preliminary Report on Patentability dated Jul. 17, 2015, 7 pages.
International Application No. PCT/US2016/021642, International Search Report and Written Opinion dated Jun. 6, 2016, 16 pages.
U.S. Appl. No. 14/109,546, Non-Final Office Action dated Mar. 14, 2016, 23 pages.
U.S. Appl. No. 14/109,651, Non-Final Office Action dated Aug. 25, 2015, 15 pages.
U.S. Appl. No. 14/109,651, Notice of Allowance dated Jan. 5, 2016, 8 pages.
U.S. Appl. No. 14/109,578, Notice of Allowance dated Jun. 23, 2016, 9 pages.
U.S. Appl. No. 14/109,546, Final Office Action dated Sep. 21, 2016, 17 pages.
U.S. Appl. No. 14/109,546, Non-Final Office Action dated Feb. 22, 2017, 21 pages.
U.S. Appl. No. 15/275,035, Notice of Allowance dated Feb. 9, 2017, 24 pages.
Wegiel, et al. "Dynamic Prediction of Collection Yield for Managed Runtimes," Association for Computing Machinery, vol. 44, No. 3, Mar. 7, 2009, pp. 289-300.
International Search Report and Written Opinion for Application No. PCT/US2014/033385 dated Jul. 17, 2014, 10 pages.
International Search Report and Written Opinion for Application No. PCT/US2014/033530 dated Jul. 17, 2014, 10 pages.
Written Opinion of the International Preliminary Examining Authority for Application No. PCT/US2014/033385 dated Apr. 29, 2015, 6 pages.
Written Opinion of the International Preliminary Examining Authority for Application No. PCT/US2014/033530 dated Apr. 10, 2015, 4 pages.
Chinese Application No. 201480020584.7, Office Action dated May 8, 2017, 13 pages (6 pages for the original document and 7 pages for the English translation).
Chinese Application No. 201480020730.6, Office Action dated Jul. 3, 2017, 13 pages (6 pages for the original document and 7 pages for the English translation).
International Patent Application No. PCT/US2016/021642, International Preliminary Report on Patentability dated Jun. 20, 2017, 10 pages.
U.S. Appl. No. 15/275,035, Corrected Notice of Allowability dated Apr. 11, 2017, 2 pages.
International Application No. PCT/US2016/021642, Written Opinion dated Mar. 24, 2017, 6 pages.
U.S. Appl. No. 14/109,546, Final Office Action dated Nov. 3, 2017, 21 pages.
U.S. Appl. No. 14/743,805, Non-Final Office Action dated Dec. 30, 2016, 16 pages.
U.S. Appl. No. 14/743,805, Notice of Allowance dated Apr. 4, 2017, 6 pages.
U.S. Appl. No. 14/743,817, Non-Final Office Action dated Sep. 25, 2017, 11 pages.
U.S. Appl. No. 14/743,847, Notice of Allowance dated Nov. 17, 2016, 10 pages.
Chinese Application No. 201480020584.7, Notice of Decision to Grant dated Nov. 29, 2017, 2 pages.
European Application No. 14724270.5, Notice of Decision to Grant dated Aug. 10, 2017, 3 pages.
Hwang et al., How to Analyze Verbosegc Trace with IBM Pattern Modeling and Analysis Tool for IBM Java Garbage Collector, IBM Pattern Modeling and Analysis Tool Architect/ Developer Available Online at: http://www-01.ibm.com/support/docview.wss?uid=swg27007240&aid=1, 2017, pp. 1-67.
International Application No. PCT/US2012/033385, International Search Report and Written Opinion dated Dec. 12, 2012, 6 pages.
International Application No. PCT/US2012/033530, International Search Report and Written Opinion dated Jul. 31, 2012, 9 pages.
International Application No. PCT/US2017/031586, International Search Report and Written Opinion dated Aug. 4, 2017, 11 pages.
International Application No. PCT/US2017/031589, International Search Report and Written Opinion dated Aug. 4, 2017, 10 pages.
International Application No. PCT/US2017/031593, International Search Report and Written Opinion dated Aug. 7, 2017, 12 pages.
International Application No. PCT/US2017/031594, International Search Report and Written Opinion dated Aug. 3, 2017, 11 pages.
Sun et al., Solving Memory Problems in WebSphere Applications, Available Online At: https://www.ibm.com/developerworks/websphere/library/techarticles/0706_sun/0706_sun.html, Jun. 27, 2007, 21 pages.
Chinese Application No. 201480020730.6, Notice of Decision to Grant dated Jan. 12, 2018, 2 pages.
U.S. Appl. No. 14/109,546, Non-Final Office Action dated Mar. 29, 2018, 22 pages.
Japanese Application No. 2016-507640, Office Action dated Jan. 29, 2019, 4 pages (2 pages for the original document and 2 pages for the English translation).
Japanese Application No. 2016-507618, Office Action dated Apr. 10, 2018, 4 pages (1 page of English translation and 3 pages of Original document).
Japanese Application No. 2016-507640, Office Action dated Apr. 10, 2018, 2 pages.
EP16711749.8 received an Office Action dated Apr. 2, 2019, 6 pages.
JP2016-507640 received a Notice of Decision to Grant, dated Jul. 30, 2019, 5 pages.
JP2017-546680 received an Office Action dated Feb. 18, 2020, 5 pages, 1 page English Translation, 4 pages Japanese Office Action.
EP16711749.8 received a Summons to Attend Oral Proceedings, dated Dec. 18, 2019, 7 pages.

* cited by examiner

KNOWLEDGE-INTENSIVE DATA PROCESSING SYSTEM

RELATED APPLICATIONS

The present application is a non-provisional of and claims priority to U.S. Provisional Patent Application No. 61/969,005, filed Mar. 21, 2014, entitled "KNOWLEDGE-INTENSIVE DATABASE SYSTEM." The present application is also a non-provisional of and claims priority to U.S. Provisional Patent Application No. 62/023,721, filed Jul. 11, 2014, entitled "SITUATION AWARE COMPUTING FOR BIG DATA." The entire contents of each of the 61/969,005 and 62/023,721 provisional applications are incorporated herein by reference for all purposes.

The present application also claims priority to and is a continuation-in-part application of U.S. patent application Ser. No. 14/109,651, filed Dec. 17, 2013, entitled "KNOWLEDGE INTENSIVE DATA MANAGEMENT SYSTEM FOR BUSINESS PROCESS AND CASE MANAGEMENT," which claims priority to U.S. Provisional Patent Application No. 61/885,424, filed Oct. 1, 2013, entitled "DATA DRIVEN BUSINESS PROCESS AND CASE MANAGEMENT", U.S. Provisional Patent Application No. 61/811,102, filed Apr. 11, 2013, entitled "SEASONAL TRENDING, FORECASTING, ANOMALY DETECTION, AND ENDPOINT PREDICTION OF JAVA HEAP USAGE", and U.S. Provisional Patent Application No. 61/811,106, filed Apr. 11, 2013, entitled "PREDICTIVE DIAGNOSIS OF SLA VIOLATIONS IN CLOUD SERVICES BY SEASONAL TRENDING AND FORECASTING WITH THREAD INTENSITY ANALYTICS." The entire contents of each of the Ser. No. 14/109,651, 61/885,424, 61/811,102, and 61/811,106 applications are incorporated by reference herein for all purposes.

BACKGROUND

Complex applications such as managing cloud services, supervising a fulfillment center, managing a grid, advancing science, or treating patients, and the like, all may require applications to manage a significant amount of data well-structured processes. As an example, conformance to service level agreements (SLA) is a critical requirement for many cloud operations. Such conformance may require continuous monitoring of key performance metrics and predictive diagnosis capability to detect impending SLA violations to enable the operations to circumvent the SLA violations or provide quicker resolution of the issues when violations occur. Such cloud operations may have to monitor, diagnose, and manage millions of hardware and software components of the data centers, networks, server machines, virtual machines, operating systems, databases, middleware, applications, etc., in private, public, and hybrid clouds of the operators and/or the customers.

Reactive fault detection and manual diagnosis techniques of traditional information technology (IT) operations may be too labor intensive, requiring extensive domain expertise, and may be too late in responsiveness, resulting in disproportionate responses involving restarts of large parts of the system instead of isolating and fixing the faulty components, and may be unable to scale properly for the cloud. Effective cloud system operations may require continuous measurement of important vital signs, time-series analytics, multivariate system state models, system response models, predictive anomaly detection, classification based on machine learning, automatic diagnosis and prognosis, decision support, and various control capability.

BRIEF SUMMARY

Aspects described herein provide various techniques for managing and processing large amounts of complex high-volume and high-velocity data by capturing and extracting high-value data from low value data using big data and related technologies. Illustrative database systems described herein may collect and process data while extracting or generating high-value data. The high-value data may be handled by databases providing functions such as multi-temporality, provenance, flashback, and registered queries. In some examples, computing models and system may be implemented to combine knowledge and process management aspects with the near real-time data processing frameworks in a data-driven situation aware computing system.

In some embodiments, techniques described herein may maintain and update multi-temporal databases, evaluate filter queries on multi-temporal databases, and invoke data transformation processes based on filter queries evaluations. Input data from data streams, big data technologies, and other raw input data may be received and stored in a multi-temporal database. Filter queries including database constructs such as expression filters, registered queries, triggers, continuous query notifications, and the like may be identified based on the updated multi-temporal data. Filter queries and/or data transaction processes may be executed based on a current data state and one or more previous data states, and the difference between the multiple executions may be evaluated. Differences between the results of different filter queries and/or data transaction processes corresponding to the different times and data states may be used to invoke additional data transaction processes and/or looping application instances.

DETAILED DESCRIPTION

Figure 1:
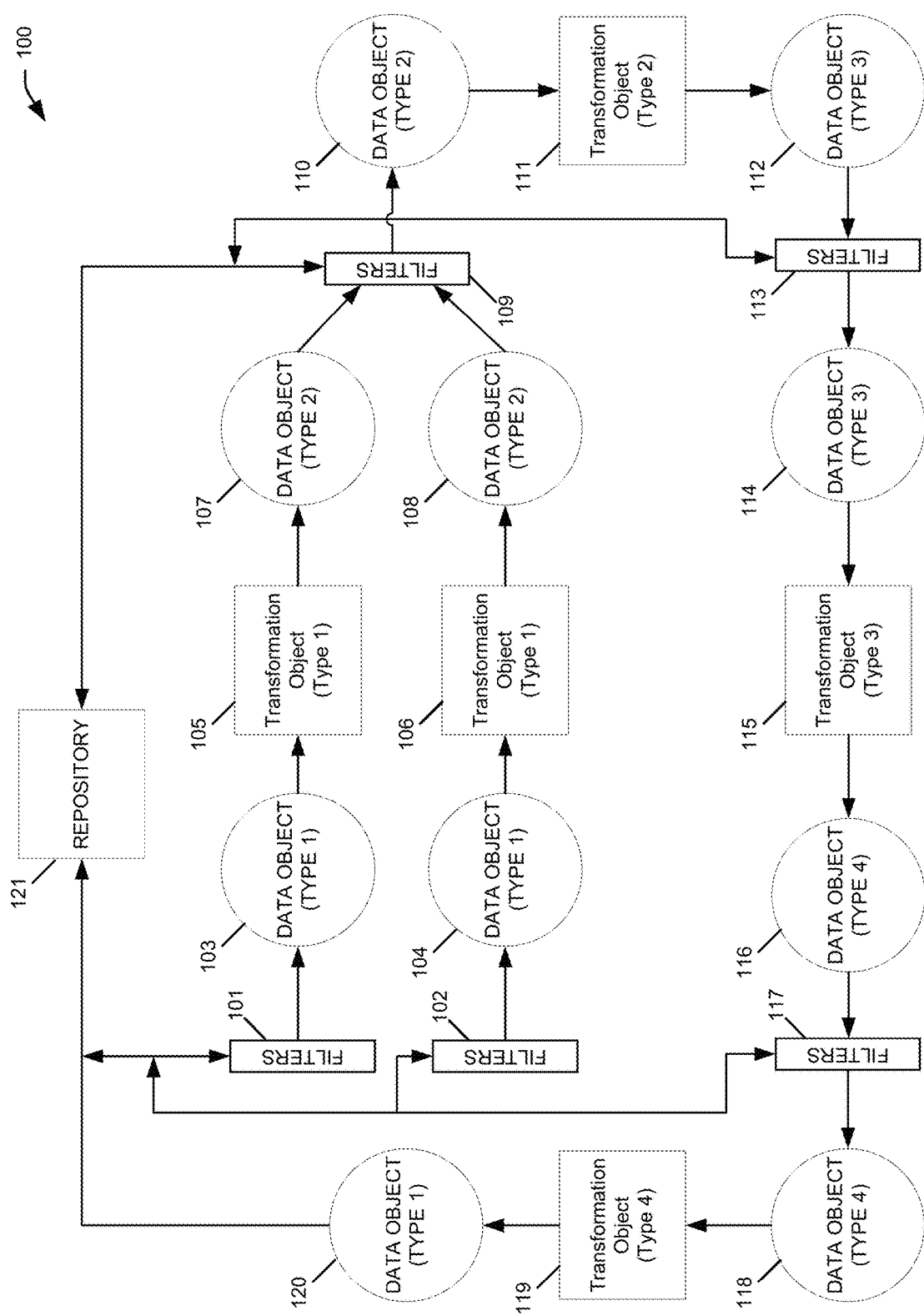
FIG. 1 is a block diagram illustrating an exemplary instance of an execution model of a data-driven transformation loop application, according to one or more embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium. A processor(s) may perform the necessary tasks.

Various techniques (e.g., methods, systems, non-transitory computer-readable storage memory storing a plurality of instructions executable by one or more processors, etc.) are described herein for managing and processing large amounts of complex and high-velocity data by capturing and extracting high-value data from low value data using big data and related technologies. In some embodiments, database systems may collect and process data while extracting or generating high-value data. The high-value data may be handled by databases providing functions such as multi-temporality, provenance, flashback, and registered queries. In some examples, computing models and system may be implemented to combine knowledge and process management aspects with the near real-time data processing frameworks in a data-driven situation aware computing system.

Techniques described herein may maintain and update multi-temporal databases, evaluate filter queries on multi-temporal databases, and invoke data transformation processes based on filter queries evaluations. Input data from data streams, big data technologies, and other raw input data may be received and stored in a multi-temporal database. Filter queries including database constructs such as expression filters, registered queries, triggers, continuous query notifications, and the like may be identified based on the updated multi-temporal data. Filter queries and/or data transaction processes may be executed based on a current data state and one or more previous data states, and the difference between the multiple executions may be evaluated. Differences between the results of different filter queries and/or data transaction processes corresponding to the different times and data states may be used to invoke additional data transaction processes and/or looping application instances.

Referring now to FIG. 1, a block diagram is shown an execution model for a data-driven transformation loop application. The execution model 100 may be implemented by an execution engine within a database system or other computing system. As described below, such execution engines may include specialized hardware, software, and/or network components configured to implement data-driven processes to instantiate, track, and control the various components within the execution model 100.

In this example, the execution model 100 includes three different categories of objects: data objects, transformation objects, and filters. Data objects may represent structured, semi-structured, and unstructured raw contents such as facts, event streams, relations, Extensible Markup Language (XML) documents, text, and the like. Data objects also may represent metadata such as categories, tags, relationships, and containers, and/or may represent contents captured through acquisition processes such as user interface forms, prescription forms, notification templates, and the like. Transformation objects may represent algorithms, scripts, processes, queries, Resource Description Framework (RDF) axioms, production rules, decision trees, Support Vector Machines, Neural networks, Bayesian networks, hidden Markov models, Hopfield models, tacit human knowledge, and various types of transformation data. Transformation objects include data that may be applied to data objects in order to add, change, or delete those data objects. Filters may correspond to path expressions and/or Boolean expressions which may be evaluated in the context of one or more data objects and transformation objects. For example, filters may include one or more registered queries in a database system that detects changes instances of data objects and/or transformation objects. Such filters may be implemented using database triggers, real-time journal analysis, and/or registered queries on top of a multi-temporal or bi-temporal database system.

As shown in FIG. 1, the illustrative execution model 100 may correspond to a looping data transformation application, which may be a potentially iterative and/or indefinite process loop. In this example and other related embodiments, each different type of data object may represent different data having different attributes or characteristics, and each different transformation object type may be an implementation of a different algorithm or system for transforming one data object type to another. Although the illustrative execution model 100 includes four types of data objects and four types of transformation objects, it should be understood that different numbers of data objects and transformation objects may be used in different implementations (e.g., 2 data objects and 2 transformation objects, 2 data objects and 2 transformation objects, . . . , 5 data objects and 5 transformation objects, each.). Additionally, it should be understood that more or less filter objects may be implemented in different embodiments, and some or all of the filters may be optional in certain embodiments.

In execution model 100, Type 1 Data Objects 103, 104, 120 may represent raw inputs into a computing system. Such inputs may include, for example, a data stream from garbage collector in a Java Virtual Machine (JVM), stack traces from periodic thread dumps, a memory heap dump, a database AWR report, etc. Type 1 Data Objects 103, 104, 120 may be unstructured conversations, form inputs, quantitative measurements collected from a device, event stream data, XML or text documents, etc. Type 2 Data Objects 107, 108, 110 may represent qualitative interpretations of observations or predictions calculated based on Type 1 Data Objects. In some embodiments, Type 2 Data Objects 107, 108, 110 may include one or more of four different data object subtypes: observation objects, prediction objects, norm objects, and objective objects. Observation objects may represent individuations of facts into discrete values. For example, an intensity of threads blocking for database connections fact (a number) could be individuated into an observation object having a qualitative value such as normal, guarded, severe, or critical. Prediction objects may represent qualitative values forecasted from changing conditions. Prediction objects may represent qualitative values interpolated or extrapolated by a model of observations, for example, through simulation. Norm objects may represent qualitative values of a historical baseline. Objective objects may represent target qualitative values whose attainment may be sought for the observation and prediction objects in order to achieve an overall objective and resolution. Type 3 Data Objects 112 and 114 may represent diagnoses or causes calculated based on Type 2 Data Objects (e.g., observations and/or predictions). For example, a failure of a load balancer that causes thread intensities of a class of threads to be classified as in hypertension state (intensity significant higher than the norm) in a first server and in hypotension state (intensity significant lower than the norm) in a second server in a cluster of two servers may be a domain-specific example of a Type 3 Data Object 112 or 114. Type 4 Data Objects 116 and 118 may represent a set of activities to be performed, calculated based on the Type 3 Data Objects. For example, a set of instructions for taking heap dumps or configuring a memory management policy may be a domain-specific example of a Type 4 Data Object 116 or 118.

Each transformation objects may represent an abstraction of knowledge, embodied by the execution on a computer system of hardware and software as an automated software program, algorithm, technique, process, or method. Like the data objects, transformation objects also may be stored in a database system, file-based storage system or any data store. Transformation objects may be stored, retrieved, and applied to various data objects to calculate different types of data within the execution model.

For instance, in execution model 100, Type 1 Transformation Objects 105 and 106 may embody techniques for calculating Type 2 Data Objects based on Type 1 Data Objects, for example, by generating a compact representation of important data taken from a pool or stream of raw data corresponding to Type 1 Data Objects. Type 2 Transformation Objects 111 may embody techniques for calculating Type 3 Data Objects based on Type 2 Data Objects. Type 3 Transformation Objects 115 may embody techniques for calculating Type 4 Data Objects based on Type 3 Data Objects. For example, Type 3 Transformation Objects 115 may include techniques for developing directives based on how much observations or predictions deviate from norm. Type 4 Transformation Objects 119 may embody techniques for calculating Type 1 Data Objects based on Type 4 Data Objects. For example, Type 4 Transformation Objects 119 may be designed to respond to hypothesis (e.g., in a Type 3 Data Object) and also to capture additional raw input (e.g., a Type 1 Data Object).

The various filter objects 101, 102, 109, 113, 117 in execution model 100 may be implemented similarly to data objects (e.g., data stored in a database or other storage system), or similarly to transformation objects (e.g., automated software programs, algorithms, techniques, etc.), or as a combination of data and programming. In some cases, filter objects 101, 102, 109, 113, 117 may implement minimum data change thresholds for determining how much change in a data object is sufficient to invoke a transformation object. Additionally or alternatively, filter objects 101, 102, 109, 113, 117 may implement minimum confidence level, by a condition, polarity, or combination of the data for determining what quality of a data object is sufficient to invoke a transformation object. As noted above, filters may include one or more of database triggers, real-time journal analysis, and/or registered queries on top of a multi-temporal or bi-temporal database system.

The data and transformation objects can implement mechanisms to remove noise from data objects, detect and extract outlier data, detect and correct for seasonal trends, and the like. For instance, a seasonal trend transformer may detect a seasonal growth trend among the data changes of a persistent data object, and may update the smoothed intensity and smoothed intensity growth rate to forecast the growth trend of the intensity. In this example, the normalized residual of the forecasted intensity may be used as a transformer for detecting outliers, which represent when the measured intensity is deviating from the expected intensity. Additionally, multiple independent transformers may execute in parallel to track data estimations running at different time scales. Depending on the time scale, such parallel transformer may serve as multiple policies for predicting seasonal trends, long-term capacity demands, short term end-points (out-of-memory errors), and the like.

Like data objects, transformation objects may also change dynamically during the execution of a data-driven supervisory control loop. In some embodiments, a supervisory control loop may execute various techniques (e.g., non-linear regression) to estimate transformation parameters and seasonal factors for instances of Java Virtual Machines in a system. In such examples, the supervisory controller loop may push the transformation parameters and seasonal factors to the transformation objects in order to update the transformation criteria/programming for one or more transformations embedded in each Java Virtual Machine (e.g., using MBean with Hotspot or JRockit instrumentations).

Looping data-driven applications, such as the application embodied by execution model 100, may be initiated, tracked, and controlled by one or more execution engines. An execution engine may, for example, instantiate each of the objects shown in execution model 100, and then execute and monitor the various processes to be performed by each object, as well as control the execution processes whenever any dynamic updates are made to data objects, transformation objects, or filter objects. After the instantiation of the various objects (e.g., via object-oriented classes), the execution engine may detect new and/or updated data within one of the data objects in the execution model 100. After the detection of the new or updated data, the execution engine may invoke the appropriate filter objects, or the filters may be executed automatically (e.g., expression filters or repeating queries), to analyze and/or modify the data, and to determine whether or not the subsequent transformation object should be invoked. If necessary, the execution engine may then invoke a transformation object to update the next downstream data object in the loop, for example, updating a Type 2 Data Object based on an update to a Type 1 Data Object. In this manner, the looping application may continue until a filter or transformation object determines that the subsequent data object should not be updated.

Additionally, a multi-temporal database repository 121 may contain both low value and high-value data. For example, the repository 121 may contain data corresponding to (FSD U Feature). The filters 101, 102, 109, 113, 117 (which also may be referred to as guards) may query the data in the repository 121 to retrieve current data states and/or previous data states, in order to execute filter criteria or processes and evaluate the differences between the criteria/processes at different time states in the database.

Additionally, during execution of a looping data-driven application, additional data updates may occur at any time to any data object. For instance, transformation object 115 may be in mid-execution updating data object 116, when at the same time a separate data object 103 is updated dynamically via a database transaction of a different process, the arrival of new data stream data, etc. In this example, the execution engine may let the execution of transformation object 115 complete, and then invoke filter 101 and/or transformation object 105, in effect changing the instruction pointer of the looping application to an entirely different portion of the execution model 100. In another example, the execution engine may, without waiting for the execution of transformation object 115 to complete, invoke filter 101 and/or transformation object 105, in effect allowing multiple instruction pointers of the looping application to work asynchronously in different portions of the execution model 100. The data objects 103, 104, 110, 114, and 118 in execution model 100 represent consistent views of the states while the data updates may be occurring at any time to any other data object.

In various implementations of the execution model 100, the different data objects, transformation objects, and/or filter objects may be stored in a database or other data store, and various database technologies may be used to implement the execution model 100 and other techniques disclosed herein. For example, object-oriented classes may be established for some or all of the categories of objects in the execution model 100, for instance, a Data Object class and a Transformation Object class. Type-specific subclasses may be derived from each of the implemented parent classes, such as a Type 1 Data Object subclass, Type 2 Data Object subclass, Type 3 Data Object subclass, and Type 4 Data Object subclass, as well as a Type 1 Transformation Object subclass, a Type 2 Transformation Object subclass, Type 3 Transformation Object subclass, and Type 4 Transformation Object subclass. Each class and subclass implementation may be given labels and attributes appropriate to the category and type of object for which they are applicable. For example, an execution engine may instantiate a Type 1 Data Object, and may store therein the values of attributes that pertain to that data object. Similarly, a Type 1 Transformation Object may be instantiated to store the values of attributes that pertain to that transformation object, and so on. Each of these object definitions, and all instances of these objects, may be stored in a data store associated with one or more applications. For instance, an execution engine of a data-driven transformation loop application may use a various database technologies to store the definitions and instances of data objects, transformation objects, and filter objects. Bi-temporal and/or multi-temporal databases may be used in order to maintain multiple versions of each instance of each object, so that a history of each instance may be retrieved. Additionally, in some embodiments, mappings between such objects (instantiations of classes, subclasses, etc.) also may be generated and stored by an execution engine.

Agent objects (or actor objects) also may be included in execution models 100, and/or may be generated and controlled by execution engines in some embodiments. Agent objects may correspond to automated agents, or may represent individuals, groups of individuals, or organizations. Agent objects may be instantiated as object-oriented programming objects, and may possess attributes such as profiles and presence contexts. An automated agent can be software that encapsulates algorithmic processes such as workflows, simulations, support vector machines, neural networks, and Bayesian networks to name a few. An automated agent can possess a profile that indicates that agent's capabilities. Agent objects may have attributes such as an organizational context, a skill profile, a knowledge profile, an interest profile, a preference profile, and the like. Such a knowledge profile can indicate tacit knowledge associated with the agent object, but which the system might not possess in an encoded manner. When an agent object represents an individual, then the agent object may specify a real-time presence and/or real-time activity for the individual represented by the object. The execution engine may assign agent objects to pending executions of specific transformation objects, based on the attributes of the agent object.

As discussed further below, the execution model 100 may enable the evolution of specialized algorithms that may be used to perform transformations like classification, assessment, resolution, and enactment to transform the data or states of the world. Transformation objects may represent specialized algorithms that might not necessarily work together directly. An execution engine of a data-driven process may allow the diverse algorithms of transformation objects to be developed independently and be integrated into a single system capable of evolving as a common application, by encapsulating these algorithms as various types of transformation objects (e.g., Types 1-4 Transformation Objects) that interact via a normalized data model. The different algorithms within the system can complement and reinforce each other. Additionally, some of the components in the execution model 100 may involve user interface and messaging systems that interact with the instances of agent objects. The execution model 100 drives the interactions by continuously querying the changes in the data object instances and initiating the execution of dependent transformation objects. Moreover, the upgrading of a transformation object (e.g., updated algorithm, new software version release, etc.) may trigger retroactive processing of data object instances to which the transformation in that transformation object has already been applied. In such cases, the transformations in transformation objects may be applied as soon as new/updated transformation objects are deployed.

Figure 2:
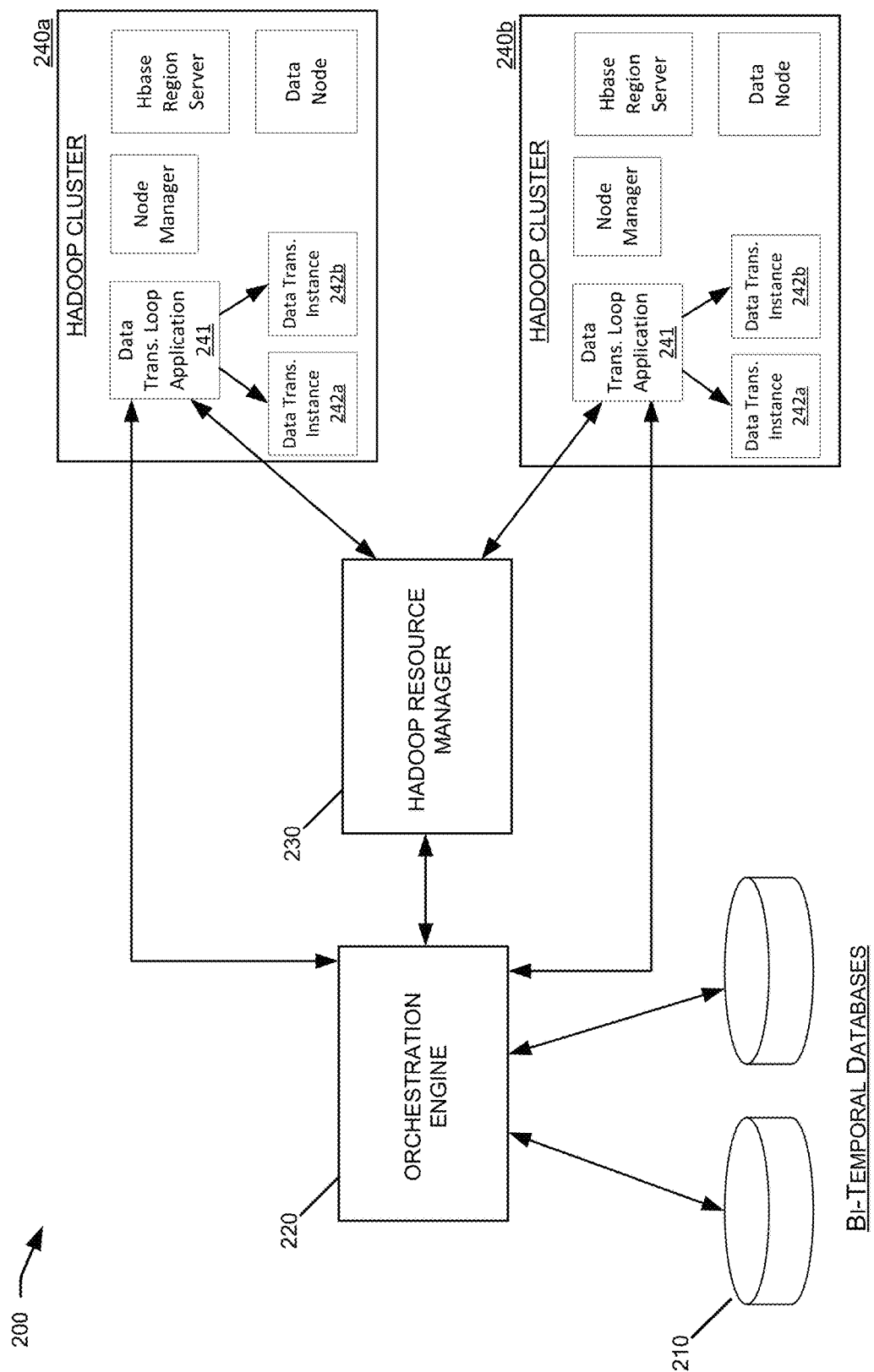
FIG. 2 is a block diagram illustrating, at a high-level, elements of a cloud-based computer system for performing data-driven applications, according to one or more embodiments of the present invention.

Referring now to FIG. 2, a block diagram is shown illustrating a computer system for performing data-driven applications. System 200 illustrated in this example may represent a high-level computer architecture for a cloud-based system used to implement and manage the execution of data-driven applications designed to handle big data analytics problems. Such problems may include very large data volumes, high data velocity, complex data variety, and also may require near real-time complex event processing capabilities. In this example, system 200 corresponds to a system for initiating and managing data-driven applications using a HADOOP software framework. It should be understood that other software frameworks instead of HADOOP may be used in other examples. The various components shown in example system 200, including bi-temporal databases 210, orchestration engine 220, resource manager 230, and computational clusters 240 may be implemented in individual or shared computer systems including specialized combinations of hardware, software, and network components.

In this example, bi-temporal databases 210 may be implemented on various database servers and technologies including the database hardware, software, and network components described herein. For databases 210 using a bi-temporal (or other multi-temporal) database schema, the various different objects stored within the databases 210 (e.g., data objects, transformation objects, filter queries, etc.) may be time stamped with transaction times when the data becomes persistent or becomes recoverable and visible to other recoverable transactions and recalled later using bi-temporal valid time and transaction time queries. Based on these reification relations in the bi-temporal databases 210, it may be determined for any event manifested in the data, such as updates to data objects, transformation objects, filters, etc., what caused the change. For example, a relationship in the bi-temporal databases 210 may show that an instance of Type 1 data during a particular time interval was classified as one type of issue, and that a particular fix was prescribed within the big data system to address the issue. In this example, the bi-temporal databases 210 may enable to orchestration engine 220 or other system components to multiple different prescribed fixes in time order of when each fix was determined and prescribed, in order to determine why changes in the data occurred. In other embodiments, other multi-temporal databases may be used, for example, a multi-temporal databases including an additional timeline or time data for data items corresponding to a decision time.

Orchestration engine 220 may be implemented to create and manage applications for big data analytics systems using combinations of specialized hardware, software, and network components. The orchestration engine (or execution engine) 220 may be implemented within the same database system as the bi-temporal databases 210, or may be implemented as a separate control server. In either case, the orchestration engine 220 may be designed to leverage the database technologies associated with the bi-temporal database 210, such as complex temporal registered, flashback queries, and expression filters. The orchestration engine 220 may assign data transformation loop application to a resource manager, such as HADOOP resource manager 230 (e.g., a HADOOP YARN Resource Manager). In response, the HADOOP resource manager 230 may select a compute node with a HADOOP cluster 240, and may launch an application master (AM) 241 for the data transformation loop application within the selected HADOOP cluster 240. In some cases, an application master 241 may negotiate with the HADOOP resource manager 230 for a container to run a data transformation for the loop application. In the context of big data analytics, such data transformation activities may include, for example, machine learning activities, classification activities using large volumes of raw data, a Bayesian Belief Network (BBN) engine, a non-linear regression process, a seasonal trending process, etc. In some embodiments, the application master 241 for a data transformation loop application may be a long running process. However, whenever the execution of a looping process (e.g., execution model 100) for the application is closed or suspended, the container within the HADOOP cluster 240 may be reused. The orchestration engine 220 may manage the states of each application master 241 for each data transformation loop application, and each application master 241 in turn manages the states of its associated data transformation instances 242. The application masters 241 and data transformation instances 242 may synchronize one or more high-value data objects with corresponding data in the bi-temporal database 210.

In certain examples, system 200 may correspond to a big data analytics application for a cloud-based SaaS system. For example, each tenant application SaaS system in a public cloud may be implemented as a pod, or an assembly of a virtual machines and database instances using one or more virtualization technologies. The pod scale model of the application SaaS may enable logical clustering of the machine data, and analytics may take advantage of the data locality for joining and correlating among the data streams in the same pod. In this environment, the number of data streams (one per sensor) per pod may grow while the number of pods grows continuously. The data streams may include, for example, WebLogic server logs, Java Virtual Machine (JVM) garbage collector logs, JVM thread dump logs, HTTP access logs, operating system watcher logs, network device logs, database logs, and the like. The data streams may be stored, for example, in a set of HBase tables and HDFS folders. In some examples, the regions in the Hbase tables may be split using 32-hexdigit MD5 digest of the pod names in row key prefix to collocate all of the data streams for each pod in the same HBase region server. When a data stream in a column cell grows larger than a threshold, it may be offloaded to an HDFS file. The extract transform load (ETL) operations may be performed by the mappers in MapReduce, and with data local affinity between the Mappers and the HBase region servers, the HDFS files and the HBase regions for the same pod may thus be co-located in the same data node or HBase region server. The data organization described in this example may enable data-local and a relatively small percentage of rack-local computations among the application masters 241 for the loop applications, data transformation operations, HBase regions, and HDFS data nodes. Additionally, in such examples, the orchestration engine 220 and application masters 241 may use a dynamic entity model to select the compute nodes with the HADOOP cluster 240 to launch the data-local application masters 241 and containers.

The dynamic entity model of the application SaaS in the above examples may represent the relationships among a customer pod, applications deployed in virtual machines, virtual machines deployed in the physical compute nodes in the cluster of servers, the databases deployed in the physical database nodes in the servers, and also the entities discovered by dynamic classification of high intensity stack traces in the periodic thread dumps by thread segments, thread classes, and/or dependency relationships between classes of threads. The dependency relationships may capture the inter-thread and inter-process communication between threads. In this way, the stack trace classification model may be added to the entity model. As described above, the dynamic entity model may be managed by a temporal database (e.g., a bi-temporal or other multi-temporal database).

Figure 3:
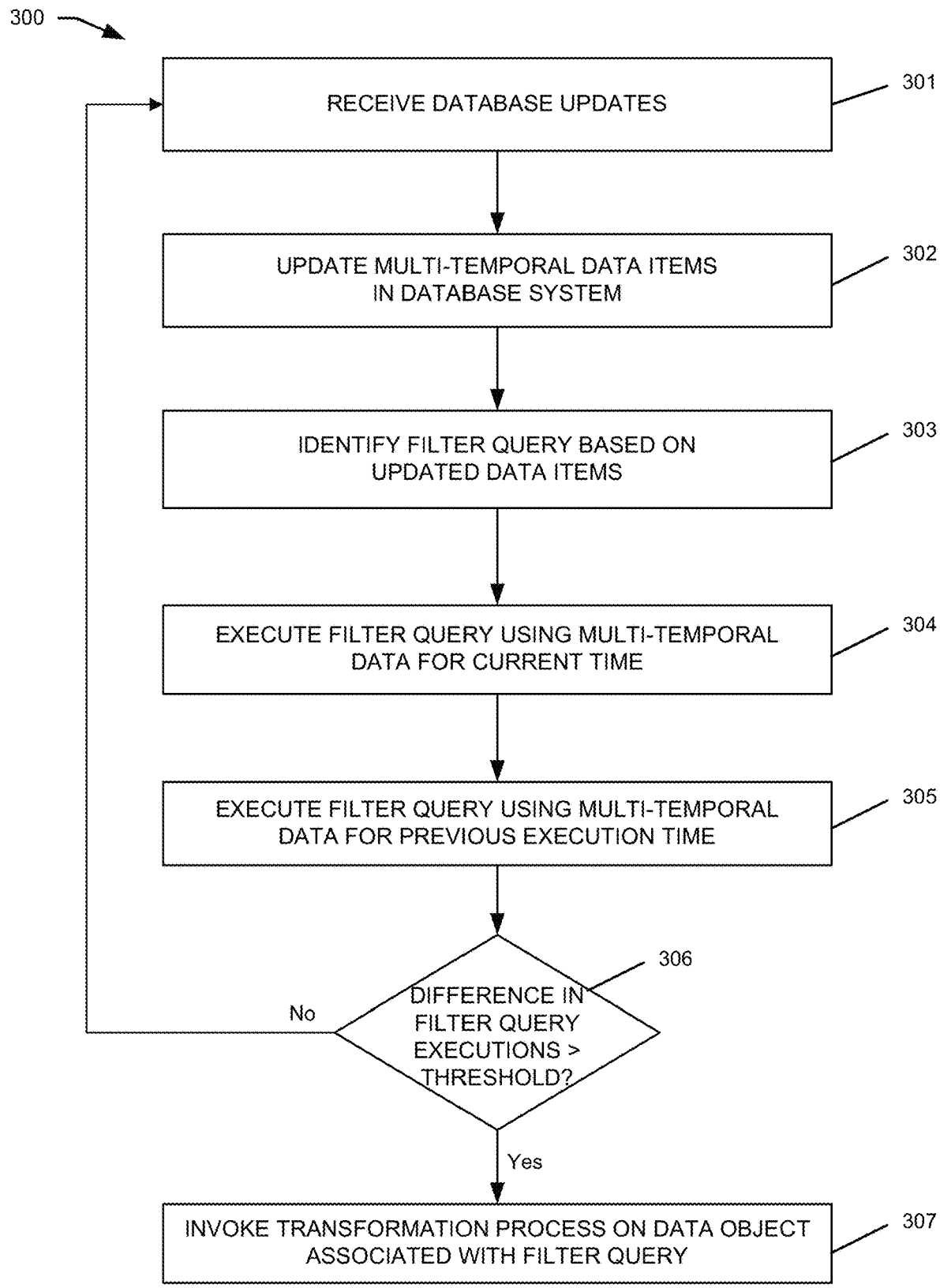
FIG. 3 is a flowchart illustrating a process for invoking a data object transformation based on an filter query in a multi-temporal database, according to one or more embodiments of the present invention.

Referring now to FIG. 3, a flowchart is shown illustrating the invocation of a transformation process on a data object, based on an filter query in a multi-temporal database. As described below, the steps in this process may be performed by one or more components in the system 200, such as the bi-temporal database 210, orchestration engine 220, and resource manager 230, etc. However, it should be understood that the techniques described herein, including maintaining and updating multi-temporal databases, evaluating filter queries on multi-temporal databases, and invoking transformation processes based on filter queries evaluations, need not be limited to the specific system and hardware implementations described above, but may be performed within other hardware and system environments comprising other combinations of the hardware, software, and network components. Further, although the example process 300 is performed based on an update of database data, similar processes and techniques may be performed in response to updates in transformation objects and/or filter objects.

In step 301, database updates may be received, for example, at a data store and/or data management device associated with a looping data-driven application. For example, a database transaction including one or more data updates may be initiated on a bi-temporal database 210, or received via an orchestration engine 220, HADOOP cluster 240 or other data source. The updated data received in step 301 may include structured, unstructured, and/or semi-structured data corresponding to any of the various data types discussed above in reference to the data objects in FIG. 1 (e.g., unstructured conversations, form inputs, quantitative measurements collected from a device, event stream data, XML, or text documents). In various implementations, the received data may represent, for example, data streams from garbage collectors in Java Virtual Machines, stack traces from periodic thread dumps, memory heap dumps, database AWR reports, and the like.

In step 302, one or more multi-temporal databases may be updated to reflect the data updates received in step 301. For example, in bi-temporal database 210, the updated data may be inserted into the appropriate database structures including a transaction time and/or a valid time for the updated data. A transaction time associated with received data may correspond to one or more time ranges during which the data is believed to be true, while the valid time may correspond to the time range during which the received data actually is true with respect to the reality of the modeled system. Either or both of the transaction time and the valid time may be included with the data received in step 301. Alternatively, the transaction time and/or valid time may be dynamically determined for received data, for example, by orchestration engine 220. For example, in some cases, the valid time of received data may be delimited by the life cycle of an object associated with the data, by the life cycle of a database. Additionally, certain objects may include multiple valid times. For example, a feature vectors may include multiple features having different and potentially overlapping valid times. In this example, the valid time for a feature vector may be intersection of the valid times for all of its associated features.

In some embodiments, the systems, software frameworks, and/or execution models described herein may track the valid time for each data object (e.g., all Type 1-4 data objects in FIG. 1), as well as the transaction time when the data becomes persistent or becomes recoverable and visible to other recoverable transactions. By tracking both the valid time and transaction, these systems may allow the data values of data objects instances to be determined for different times, as well as to determine the reasons for any previous changes to the data object instances. For example, for an instance of a Type 4 Data Object (e.g., a directive type data object), the different Type 1-3 data objects upon which the Type 4 Data Object was based may be formally related to the Type 4 Data Object. Therefore, the orchestration engine 220 or other system components may retroactively determine, for the Type 4 Data Object, which associated Type 1-3 Data Objects were available at the time when the current version of the Type 4 Data Object was generated. Over time, new data may be available in the form of updates to various Types 1-4 Data Objects in the execution model, and potentially as a result of previously generated directives and similar data in the looping application. This new data may be applied retroactively to the different object/data states as of a previous valid time at different transaction times, when the new data becomes available (e.g. becomes recoverable and visible to other recoverable transactions).

Therefore, any changes/updates occurring in data after the execution of a subsequent transformation process based on the previous data may be separated as non-causal and may be delineated using the transaction time of the data changes, even though the data changes may be applied retroactively as of the valid time that is formally related to the transformation process. Later-acquired data updates that might have influenced the performance of the data transformation process, if those data updates had been available earlier, may be clearly identified as non-causal to the data transformation process. Such later-acquired data updates may be filtered from various data views, reports, or analyses, so that there is no confusion as to the underlying data on which the results of the data transformation process were based. At any moment in time, the system may calculate why a particular data transformation process was initiated, and the underlying data that was available to and used by the data transformation process (e.g., one or more Type 1 Data Object instances) to generate the result (e.g., an updated Type 2 Data Object instance). These retroactive analyses may be performed by recalling various data as of an earlier transaction time before the data was subsequently amended at later transaction times. In certain embodiments, this bi-temporal provenance capability may be used to meet certain regulatory requirements.

In step 303, one or more filter queries are identified based on the updates performed to the multi-temporal database in step 302. Filter queries may include any number of techniques and mechanisms used to track and manage states of changing data within a multi-temporal database. For example, filter queries may include database constructs such as expression filters, registered queries, triggers, continuous query notifications, and the like, within a bi-temporal database 210. Additionally, filter queries may include forward-chaining and/or back-chaining data extraction and rules systems implemented within an orchestration engine 220 and/or other system components. Such forward-chaining and/or back-chaining data may integrate multiple inference engines and/or time-series algorithms. Some filter queries, such as expression filters and registered queries, may be implemented entirely within one or more database systems, while others may be implemented partially or wholly outside of the database, such as database access software executing within an orchestration engine 220 or other system component.

In this example, filter queries may be designed and implemented to provide notifications and/or execute certain processes in response to a set of underlying data changes in a multi-temporal database. In some cases, filter queries may correspond to conditional expressions that may be associated with one or more columns of a relational database table. For instance, filter queries may match the incoming data from the data updates in step 303 with expressions stored in a database column to identify rows of interest. In some cases, filter queries may correspond to simplified SQL queries that provide notifications or execute functionality whenever the underlying data to the SQL query changes in the database. To illustrate, if the result of a SQL query depends on four separate underlying data elements within a database, then a filter query may generate a notification or execute a process whenever any of the underlying data elements changes within the database. In some cases, the filter query might not definitively determine that the result of a SQL query or other data-driven process has changed, but only that it might potentially change because the underlying data on which the result depends has changed. In other cases, a filter query may determine that the output of a SQL query or other data-driven process will definitively change the next time the query or process is executed with the updated data.

In step 304, after identifying one or more filter queries associated with the updated data in the multi-temporal database, the filter queries may be executed using a current time state of the multi-temporal data. Thus, execution of the filter queries may be based on the updated data received in step 301, as well as other current data states within the multi-temporal database.

In step 305, the same one or more the filter queries executed in step 304 may be executed using a previous time state of the multi-temporal data. In some cases, the previous time state may correspond to a previous time that an associated transformation action (or process) was previously executed. As discussed above, filter queries may be associated with transformation actions or other automated processes. For instance, in the example execution model 100, filter queries 101 and 102 may act as guards to determine when transformation objects 105 and 106 are invoked, respectively. Similarly, filter query 109 may determine when transformation object 111 is invoked, and so on. Therefore, for a filter query associated with an instance of a data transformation object, the previous time state determined in step 305 may be the most recent time that the data transformation object was executed. After determining the previous time state(s) for the execution of the filter queries in step 305, the bi-temporal data (e.g., transaction times and valid times) stored in the database may be used to generate the accurate data state within the database as of the previous time. In some cases, filter queries might not be executed in step 305, but instead the result of a previous execution of the filter queries as of the determined previous time may be retrieved and used in step 305.

In step 306, the results of the one or more filter queries executed using current time state data (step 304) are compared to the results of the same filter queries executed using previous time state data (step 305), and the differences in results are compared to predetermined thresholds. In certain embodiments, a change of fact, perception, hypothesis, or directive may be qualified or quantified by a predetermined threshold condition, polarity, quality, or value. The threshold condition may include the change of transformation objects such as a new version of algorithm, bug fix, personalization or model parameters, etc., that can change the output of transformations. If the difference between the outputs of the filter query executions satisfies the threshold or exceeds the threshold (306: Yes), then a data transformation process may be invoked in step 307. Such data transformation processes may be similar to those discussed above in reference to the Transformation Objects in FIG. 1. For instance, the data transformation process invoked in step 307 may correspond to an instance of a Type 1-4 Transformation Object in the example execution model 100.

Thus, each filter query may have one or more threshold conditions, polarities, qualities, or values of change of a fact, perception, hypothesis, or directive used to determine when associated transformation processes will be executed. Higher thresholds of change of conditions, polarities, qualities, or values may require more change in the underlying temporal data, and the associated transformation processes will be executed less often. The threshold conditions, polarities, qualities, or values associated with filter queries may be advantageous in certain embodiments, for example, in big data analytics and other large scale data-driven applications in which frequent or continuous data updates are received. For example, in looping applications implemented to receive and analyze large scale data streams including, for instance, WebLogic server logs, Java Virtual Machine (JVM) garbage collector logs, JVM thread dump logs, HTTP access logs, operating system watcher logs, network device logs, database logs, and the like, it may be inefficient to execute transformation processes for every data updated received in the system. In such cases, the filter queries and associated threshold conditions, polarities, qualities, or values may serve as guard to limit the data transformation processes performed within the looping application, so that data transformation processes are performed only when the underlying data has changed to such a degree that significant downstream data object changes are likely to result.

In some embodiments, the various steps of example process 300 may be performed in different database transaction and/or asynchronously. For example, in data-driven applications that receive and analyze large amounts of streaming data or other frequent data updates, it may be advantageous to update the multi-temporal database in step 302 in one transaction, while invoking the data transformation process in step 307 in a different transaction. As discussed below, the data transformation process in step 307 may cause additional iterative and looping data updates and/or additional transformation processes to be executed. Accordingly, performance and stability in some systems may be enhanced by performing applications loops of data transformations and updates (e.g., step 307 and/or subsequent steps 401-416) within one or more transactions separate from the transaction used to update the database with externally received data (e.g., steps 301-302) or perform another event that initiated the commencement of the looping application instance. Thus, in some implementations, steps 301 and 302 of process 300 may be performed in one dedicated database transaction, while steps 303-307 (and any subsequent processes 401-416 determined based on those steps) may be performed in one or more separate transactions. Additionally, in some embodiments, potentially slow or long-running looping applications may be performed asynchronously (e.g., in an asynchronous execution mode of the database engine).

Figure 4:
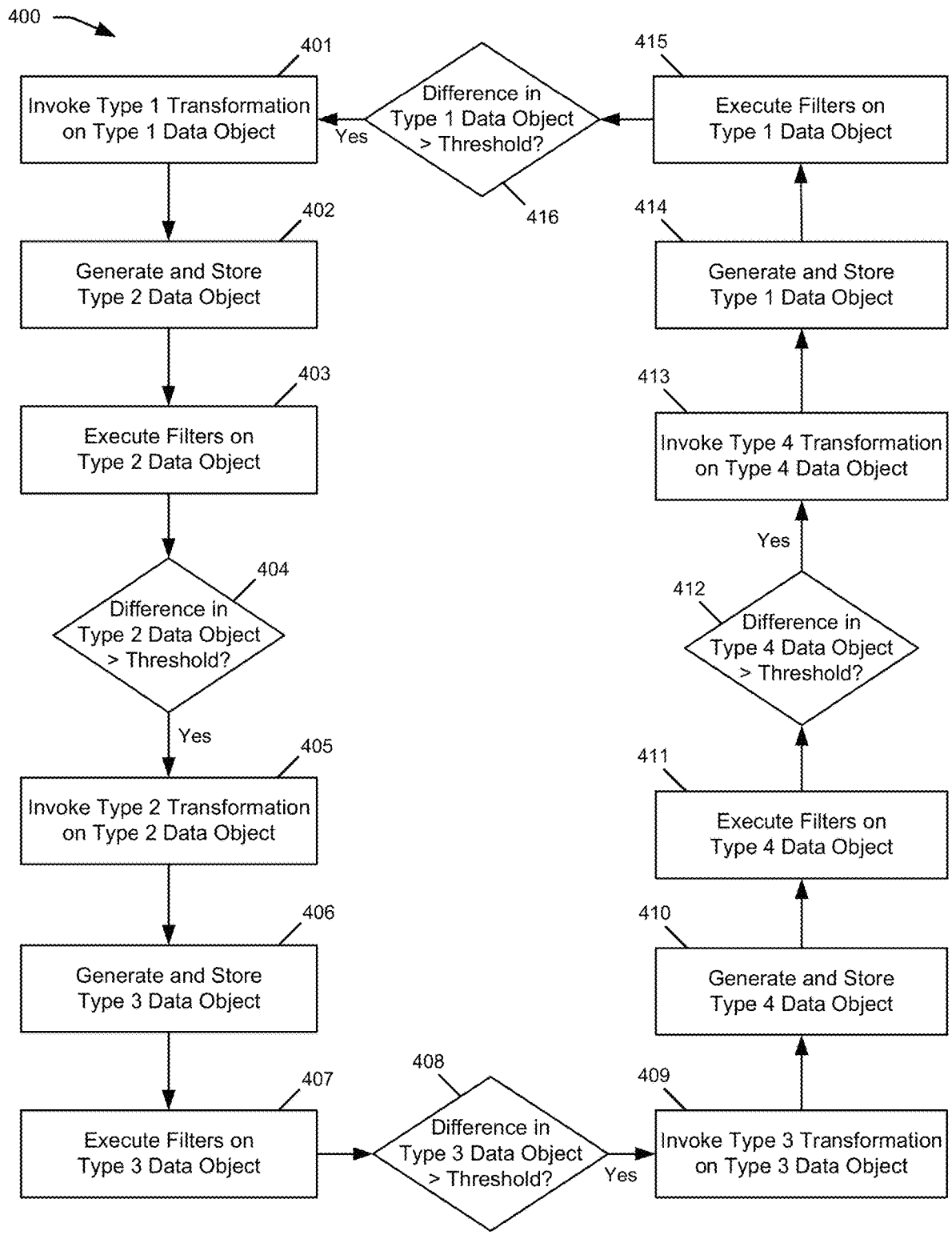
FIG. 4 is a flowchart illustrating an exemplary instance of an execution of a looping data transformation application, according to one or more embodiments of the present invention.

Referring now to FIG. 4, a flowchart is shown illustrating the execution of a looping data transformation application. The steps in process 400 may be performed by one or more components in the system 200, such as the bi-temporal database 210, orchestration engine 220, and resource manager 230, etc. However, it should be understood that the techniques described herein, need not be limited to the specific system and hardware implementations described above, but may be performed within other hardware and system environments comprising other combinations of the hardware, software, and network components.

Example process 400 shown in FIG. 4 may correspond to the implementation, by an orchestration engine 220 or other system components, of an execution model similar to model 100 discussed above in FIG. 1. Similar to execution model 100, example process loop 400 may be a potentially iterative and/or indefinite data transformation loop, although filters and thresholds are executed before each data transformation process in this example to prevent any unintended indefinite looping. The different data objects used in the example process 400 (e.g., Type 1-Type 4) may correspond different types of data objects having different attributes or characteristics, and the different transformation objects (e.g., Type 1-4) may correspond to implementations of different algorithms or systems for transforming one type of data object to a subsequent type. Additionally, although illustrative process 400 uses four types of data objects and four types of transformation objects, it should be understood that different numbers of data objects and transformation objects may be used in different examples (e.g., 2 data objects and 2 transformation objects, 2 data objects and 2 transformation objects, . . . , 5 data objects and 5 transformation objects, each.).

Process 400 may begin in step 401 which may correspond to the invocation of the transformation action in step 307, discussed above. However, in other examples, process 400 need not commence execution in step 401 but may begin in any of the data transformation invocation steps (e.g., 401, 405, 409, 413), any of the data generation and storage steps (e.g., 402, 406, 410, 414), or any of the filter execution steps (e.g., 403, 407, 411, 415). As discussed above, data-driven looping application processes may be initiated based on changes in a data state within a multi-temporal database 210, changes to transformation objects (e.g., an updated algorithm, new software version release, etc.), or changes to filter objects (e.g., an updated expression filter query, etc.). Updates to data transformation objects and/or filter queries may trigger re-calculations data that have previously been calculated using older version of the transformation objects and/or filters. Thus, an update to one or more of the system data, transformation processes, or filters may initiate the execution of the application loop process 400. Additionally, in some cases thresholds associated with filters and/or transformation objects may be dynamically updated, which may initiate the application loop process 400 by dynamically re-executing one of the threshold determinations (e.g., 404, 408, 412, 416) in response to the updated threshold value.

Figure 5:
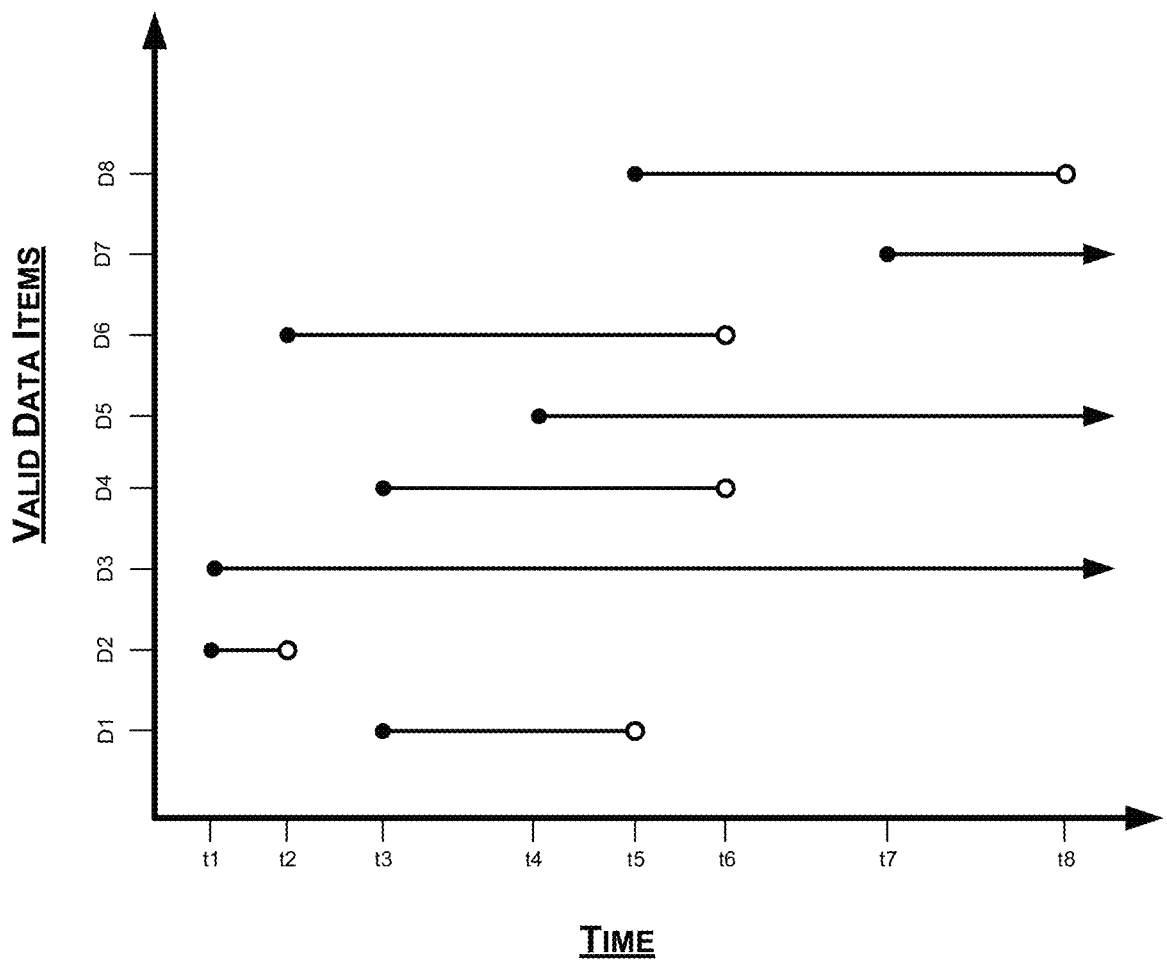
FIG. 5 is a graph illustrating a set of valid time for data items in a multi-temporal database, according to one or more embodiments of the present invention.

Referring now to FIG. 5, a graph is shown identifying the valid times of a number of example data items. The x-axis in graph 500 corresponds to time. Each time (t1-t8) labeled on graph 500 may correspond to an event occurring within the system, such as the execution of a data transformation process (e.g., via a transformation object instance), an update to the database data (e.g., via a data object instance), or an update to a transformation process or filter. The y-axis in graph 500 corresponds to distinct data items in a multi-temporal database, for example, instances of one or more of the data object types discussed above. The lines in graph 500 indicate the valid time ranges for each data item. For example, data D1 corresponds to valid data between times t3 and t5, data D2 corresponds to valid data between times t1 and t2, and so on. Because the data in this example is bi-temporal, multiple different data items D1-D8 may represent the same data (e.g., the same data object instance) at different times. For instance, data item may represent a data object instance from time t3 to time t5, and data item D8 may represent the same data object instance from time t5 to time t8.

The valid time data represented in graph 500 may be used to perform retroactive analyses as described above, for example, in step 305. Valid time data in a multi-temporal database may be used to retrieve any previous data states of the multi-temporal database in order to re-invoke or re-execution data transformation processes, and/or retroactively change data, processes, or filters used in data-driven loop applications. For example, a data-driven loop application may compare a data state within a multi-temporal database 210 and/or the results of transformation processes or filters at a current time (e.g., t8) and the same data or processes at a previous time (e.g., t6). In this example, the current time (t8) data state consists of data items D3, D5, D7, and D8, and the previous valid time (t6) data state consists of data items D3, D4, D5, D6, and D8. Thus, the corresponding filter queries, data transformation process, etc., may accurately reflect the transformation processes performed and the underlying data states that drove the process, at the current and previous times.

Figure 6:
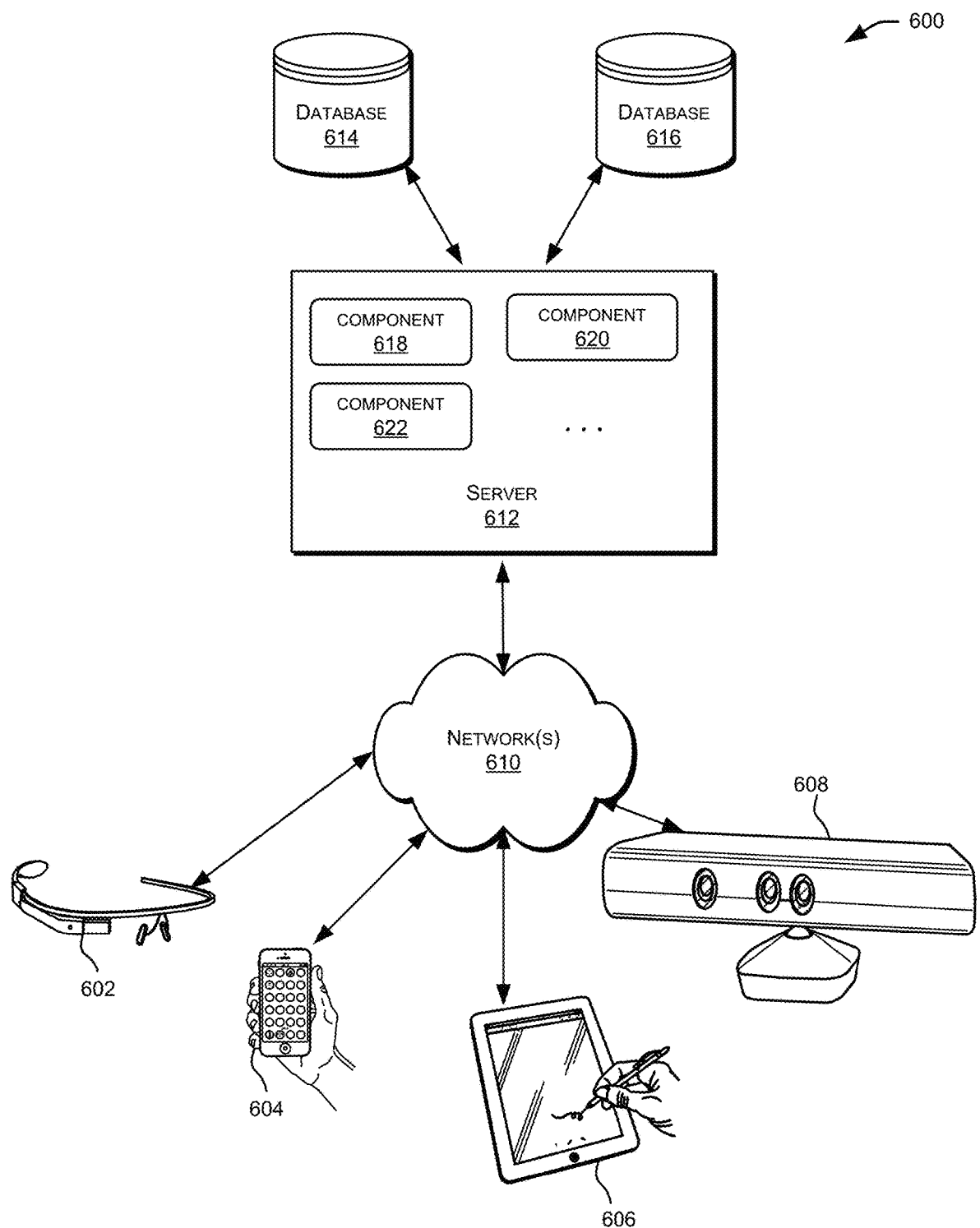
FIG. 6 is a block diagram illustrating components of an exemplary distributed system in which various embodiments of the present invention may be implemented.

Referring now to FIG. 6, is a block diagram illustrating components of an exemplary distributed system in which various embodiments of the present invention may be implemented. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
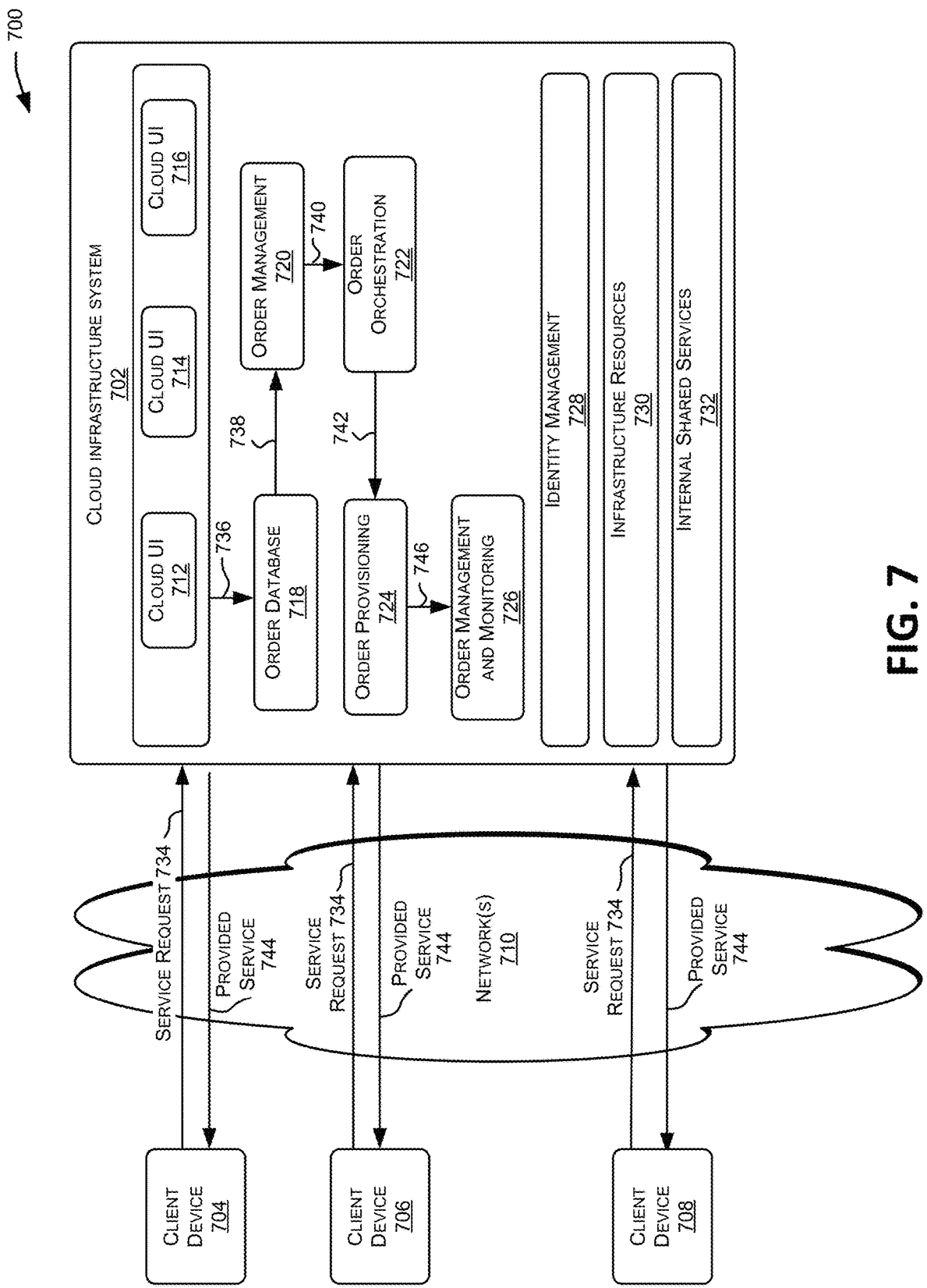
FIG. 7 is a block diagram illustrating components of a system environment by which services provided by embodiments of the present invention may be offered as cloud services.

Referring now to FIG. 7, a block diagram is shown illustrating components of a system environment by which services may be offered as cloud services. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 110.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

In some Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
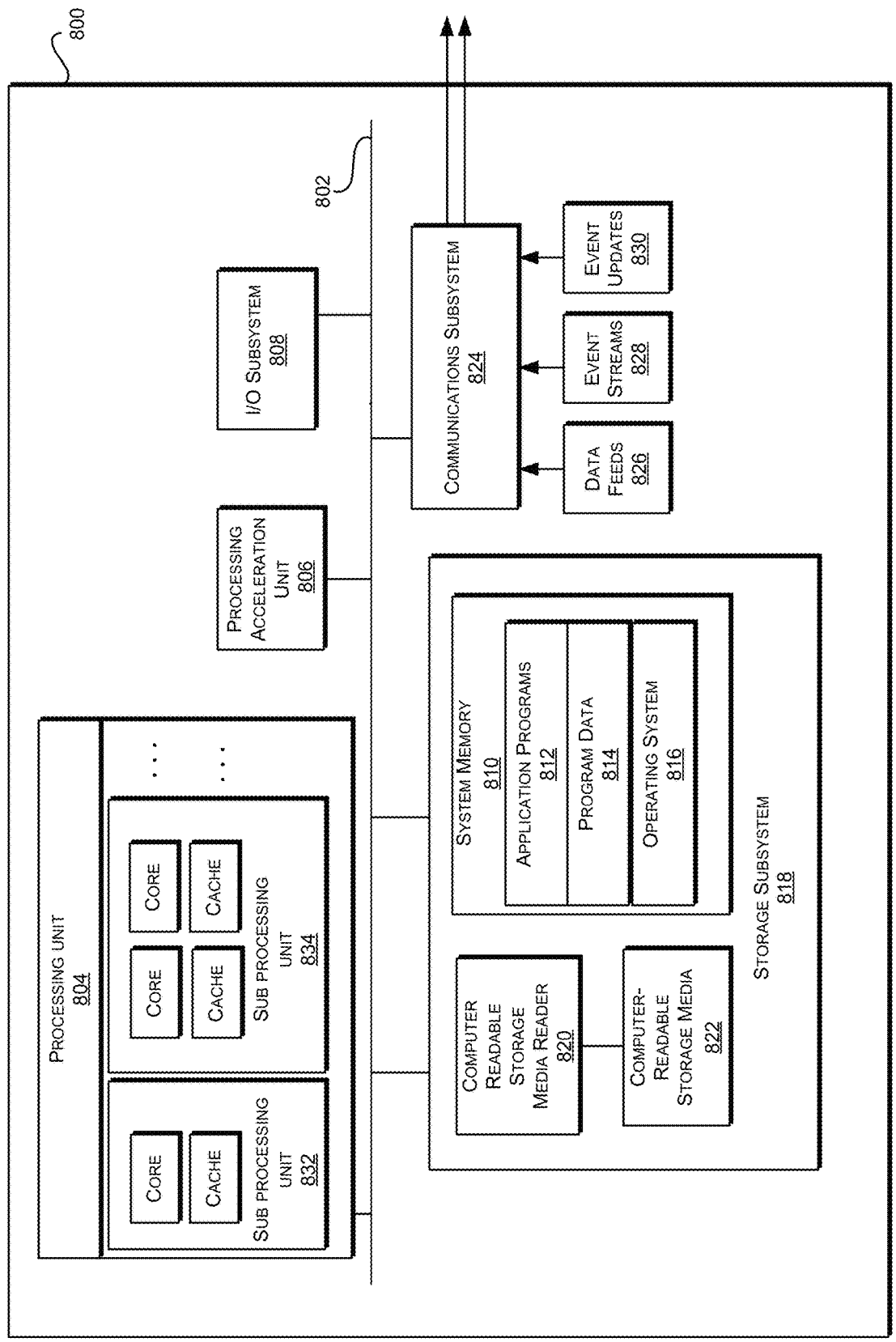
FIG. 8 is a block diagram illustrating an exemplary computer system in which embodiments of the present invention may be implemented.

Referring now to FIG. 8, a block diagram is shown illustrating an exemplary computer system in which embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include non-transitory and tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

Example Embodiments

Figure 9:
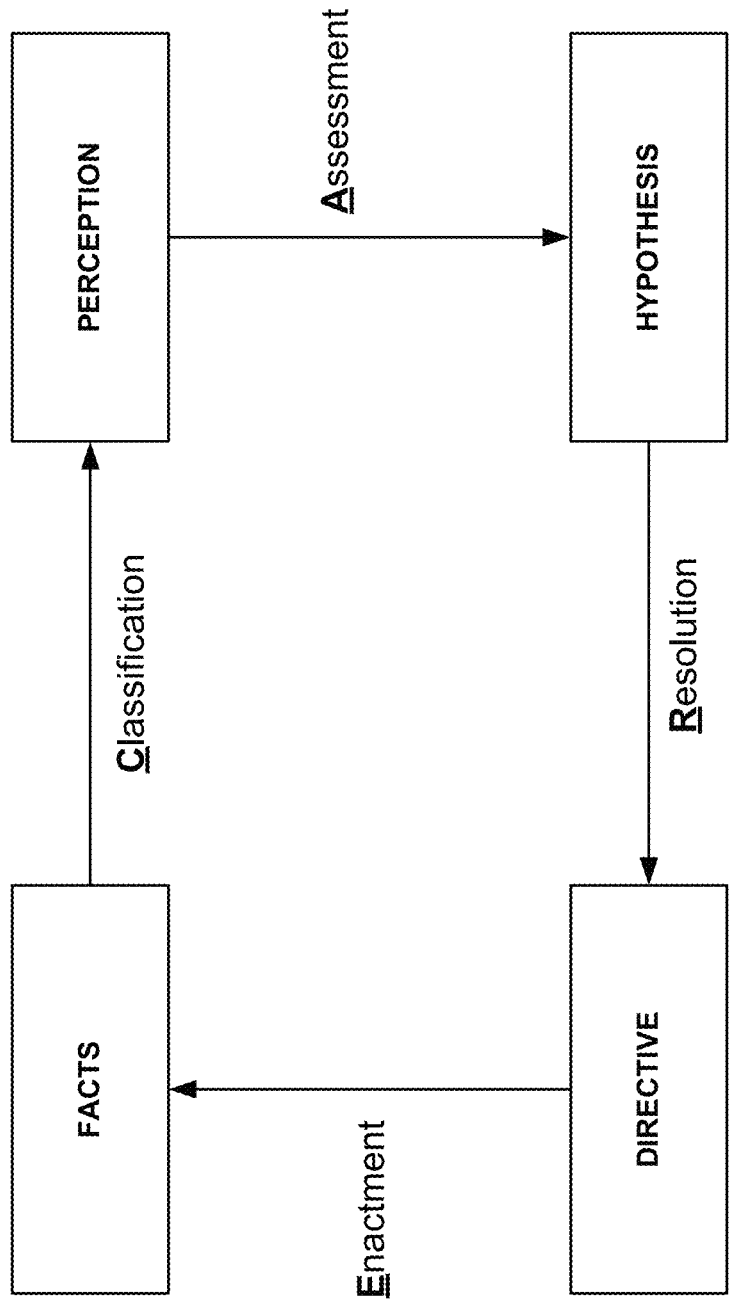
FIG. 9 is a block diagram illustrating an example model for managing data, knowledge, and processes, according to one or more embodiments of the present invention.

Referring now to FIG. 9, an example Knowledge-Intensive Database System (KIDS) model is shown for managing data, knowledge, and processes in a synergistic, consistent, and well-structured way. As discussed below, the model describes capturing quantitative facts, classifying the facts to derive compact qualitative information, assessing the information to arrive at one or more hypotheses, and using these hypotheses to formulate directives (or to decide that nothing should or could be done). The resulting directives may be acted upon to create new facts, and so on.

Looking at the KIDS model in FIG. 9 from the perspective of knowledge, the CARE (Classification, Assessment, Resolution, and Enactment) loop consists of four distinct categories of knowledge acting on and producing specific categories of data. The CARE loop represents a normalized workflow. Looking at the same loop from the data perspective, the FPHD loop (Facts, Perceptions, Hypotheses, and Directives) represents four distinctive types of data; data describes things that are typically stored in modern database systems without any distinction. Formal knowledge is stored in articles, books, application code, workflow, case management systems, or decision support systems without any distinction about which knowledge is best used at what time and how everything interacts. To make up for this deficiency, the CARE/FPHD loop provides a much needed structure of interaction between data, knowledge, and processes in applications.

In this embodiment, KIDS may include the KIDS model itself, the tools, and an infrastructure designed to manage the four categories of data, the four categories of knowledge as well as the activation of the knowledge and data based on a normalized process structure. The KIDS model may intertwines data, knowledge, and processes as seen in the real world. It moves away from the current model where knowledge and processes live in their respective worlds separately from each other and the data. KIDS tools allow users to develop applications based on the KIDS model. These tools leverage existing tools that are available for the various components and add support (constraints) to comply with the KIDS model. The KIDS infrastructure leverages existing technology, especially modern databases and application servers, to manage the application execution, the data, and the knowledge in the form of rules, stored queries, models, the procedures for transforming data, and the workflow to control the use of the knowledge.

KIDS may connect the two evolving Big Data and CEP technologies in the management of data. Although the classification phase of the CARE loop may be implemented with the Big Data technology (in an ad-hoc/batch context) or with the CEP technology (in a real time context), nevertheless KIDS goes much further than either of these two technologies by categorizing the data and knowledge representations and embedding these technologies into a modern applications structure; i.e., BIG Data and CEP are two important infrastructure elements of KIDS among other important technologies, including FSD (Flexible Schema Data), multi-temporal databases, provenance, ILM (Information Life Cycle Management), registered queries, OLAP data cubes, etc.

In various embodiments, KIDS provides the following:
a model for structuring applications to better manage data, knowledge, and processes,
a normalization of the data, knowledge, and interaction by introducing four pairs of complementary categories, each pair serving a specific purpose in the interaction structure,
an encompassing context for Big Data and CEP,
a declarative specification of all components,
a state tracking, time travel, and provenance capabilities, and
a model for continuous application evolution through infrastructure improvements, evolving user specifications, and knowledge discovery from data.

Use Case—Cloud Operation

For cloud operations, conformance to service level agreements (SLA) may be a critical requirement. It needs continuous monitoring of key performance metrics and predictive diagnosis capability to detect impending SLA violations to enable the operations to circumvent the SLA violations or provide quicker resolution of the issues when violations occur. A typical cloud operation has to monitor, diagnose, and manage millions of hardware and software components of the data centers, networks, server machines, virtual machines, operating systems, databases, middleware, applications, etc., in the operator's and customers' private, public, and hybrid clouds. The reactive fault detection and manual diagnosis techniques of traditional IT operations are labor intensive, require extensive domain expertise, often too little or too late in responsiveness, often resulting in disproportionate responses involving restart of large parts of the system instead of isolating and fixing the faulty components, and obviously cannot scale out for the cloud. Cloud operation is the domain that can only thrive by rapid iteration of KIDS loops, such as the CARE/FPHD loop shown in FIG. 9, to get inside the dynamics of seasonal cycles, load trends, load spikes, system response characteristics, transient glitches, early warning of degradations, aging, and performance drifts of millions of components in the environment. Such systems may need continuous measurement of important vital signs, time-series analytics, multivariate system state models, system response models, predictive anomaly detection, classification based on machine learning, automatic diagnosis and prognosis, decision support, and control capability through the computerized KIDS loops.

The basic postulate of cloud computing is the economy of scale by consolidation and pooling of the physical resources and providing virtually unlimited resources by dynamic resource management. The control system needs to manage the dynamic entity model to provide an accurate awareness of the system that changes due to frequent new software releases, patches for bug fixes, hardware upgrades, capacity scale out, besides the dynamic resource management.

In this section the complexity of the entity model is described, along with the volume of machine data carrying the important vital signs for the system health. The Big Data analytics and real-time CEP technologies are gaining much attention in this problem domain, though each technology by itself is inadequate for this problem domain, but nevertheless, the two technologies have remained largely disconnected. It requires a framework like the KIDS to integrate them and to augment them with other essential technologies for large scale state management, such as bi-temporal database, expression filters, registered queries, and forward-chaining and backward-chaining orchestration engine to integrate many inference engines, such as RETE, BBN, MSET, SVM, neural networks, OWL, and miscellaneous time-series algorithms.

Figure 10:
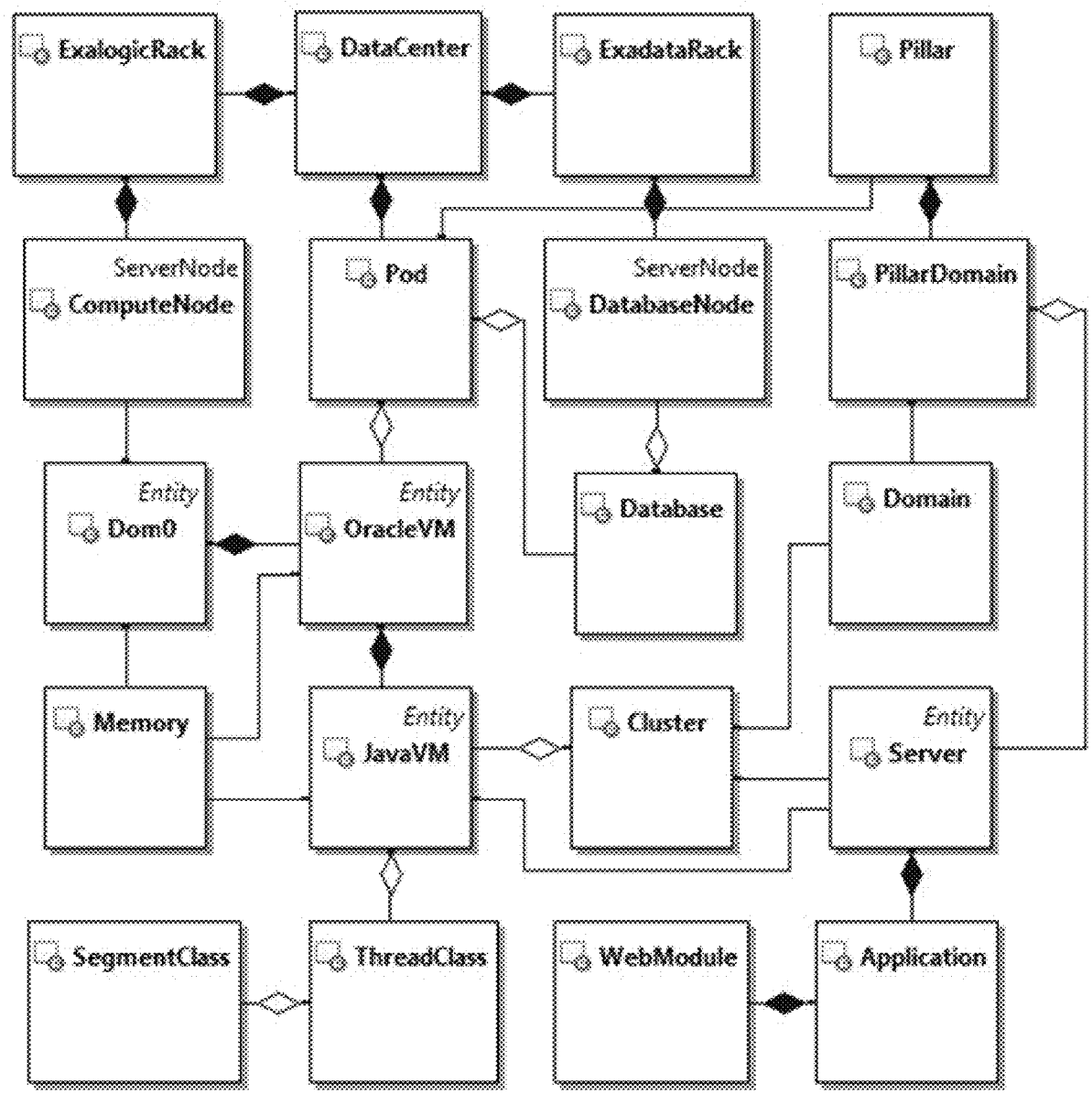
FIG. 10 is a block diagram illustrating an entity model, according to one or more embodiments of the present invention.

Referring now to FIG. 10, an entity model is shown for Oracle Fusion Applications SaaS comprising the customer pod, the Fusion Applications deployed in virtual machines, the virtual machines deployed in the physical compute nodes in the Exalogic rack, and the databases deployed in the physical database nodes in the Exadata rack. This entity model is extended with entities discovered by dynamic classification of high intensity stack traces in the periodic thread dumps by thread segments, thread classes, and dependency relation between classes of threads; the dependency relation captures the inter-thread and inter-process communication between threads. Adding the stack trace classification model to the entity model is much like adding the human genome informatics to the human anatomy model in system biology.

Thread intensity provides a statistical measure of the "hotness" of a performance hotspot in the system functions. The hotness of a code block can be quantified by the number of invocations of the code block times the execution time of the code block. Similar measures have been applied in various performance analysis tools such as Oracle Sun Studio 12 Performance Analyzer, Intel VTune Amplifier, AMD CodeAnalyst, Oracle Database Active Session History (ASH), Oracle JRockit Flight Recorder, and UNIX gprof command.

A thread class is an ordered collection of segment classes, for example a CRM Domain Sales Server ADF Application thread is represented by a tuple of segment classes (CRM Domain, Sales Server, ADF-Application, ADF Web Service Invocation). An example thread dependency relation is [(ADF Web Service Invocation)→(ADF Web Service, ADF-BC)], which has a subclass [(CRM Domain, Sales Server, ADF-Application, ADF Web Service Invocation)→(CRM Domain, Order Capture Server, ADF Web Service, ADF-BC, DATABASE Operation)]. The class (ADF Web Service, ADF-BC) may be drilled down to a high-intensity class (CRM Domain, Order Capture Server, ADF Web Service, ADF-BC, DATABASE Operation) and drill across the thread dependency relation to a database thread (DATABASE, Fusion Applications Schema) and continue to drill down the call graph, call tree, or call stack model (including the SQL execution plan and execution traces) in the database to a high-intensity subclass of the (DATABASE, Fusion Applications Schema) thread.

The Execution Context ID (ECID) propagated along an invocation chain may be used to correlate the exception traces across the middleware and database tiers to aid in root cause analysis of problems in the individual execution contexts. A vital sign may be used based on the measurements of intensity statistics for various classes of threads and thread segments from a series of thread dump samples taken at regular time intervals to diagnose systemic problems. The dependency information between classes of threads can be used to correlate incidences across the middleware and database tiers to aid in the root cause analysis. Thread intensity statistics enhances the ability to drill-down the classification hierarchy to observe the intensity of specific subclasses of thread segments. It enhances the observability of the traffic intensity of the queues in the communication channels or resource pools between threads and the sensitivity for small performance glitches which are leading indicators of SLA issues.

The data cubes are defined with dimensions and concept lattices reflecting the "part of" relations in the entity model to support OLAP operations, such as roll-up, drill-down, slice and dice, pivot, drill-across, drill-through, etc. Predictive diagnosis solutions require a state space model of the system that includes measurements of various system statistics that constitute the vital signs of the system functions. Multivariate State Estimation Technique (MSET) is especially effective for information fusion of time series data from related set of entities. MSET combined with Sequential Probability Ratio Test (SPRT) is a robust classification model that applies machine learning for predictive anomaly detection. The statistical measures are extracted from logs in big data systems and organized in the data cubes. The statistical measures include trend and seasonality information derived by time series filters. A special time series filter may be implemented based on Brown's exponential filter, Holt's double exponential filter, Winters' triple exponential filter, Wright's extension for irregular time intervals, Hanzak's adjustment factor for time-close intervals, and/or outlier detection and clipping with adaptive scaling of outlier cutoff to overcome the Cauchy distribution problem, especially in time series analysis of JVM full GC statistics. Trends may be extracted, such as level spikes, level drifts, variance changes, outliers, and endpoint predictions, from time series data and transformed the quantitative trends into qualitative values such as low, normal, or high.

The fact data, including JVM full GC statistics and periodic thread dumps, may undergo transformations to extract increasingly higher levels of classification information. Thread segments and threads are incrementally classified according to their traffic intensities. The stack traces are classified into high-intensity thread segments and threads and into higher form of information that includes the dependency relations among thread classes and drill-down of thread classes into segment classes. The time-series data for periodic thread dumps contains trending information for the intensity of each thread class and segment class, such as seasonal cycles, linear trends, variance changes, level spikes, level drifts, outliers, and saturation or endpoint predictions. The trend information reduces a large volume of time series data into a more concise sequence of events, with the number of events proportional to the number of substantive trend changes over the time window of observations. The system states can be identified by the feature vectors for the trend information and the system state transitions can be demarcated by events that represent substantive changes in the trends.

Thus, the KIDS model may enable information fusion across various special types of information, such as the observation, objective, prediction, simulation, seasonal forecast, etc., deduced by different classification knowledge, and across related entities. The KIDS model may also enable the information fusion and situation awareness at the level of the complexity and heterogeneity needed to support the effective KIDS-Loops to detect anomalies, diagnose root causes, and dynamically manage resources in large scale cloud operations.

Use Case—Software and Hardware Product Support

This use case may be characterized by collaborative and iterative problem solving activities involving support and customer personnel to minimize system unavailability. To achieve these objectives, it may be important to minimize the time required to either, find and apply existing knowledge (tacit or explicit) to resolve known issues, or to discover remedy for new issues. Increasing and/or maximizing the automation of handling known issues may free support and customer personnel to focus on newly emerging issues that require a great deal of collective human experience and intelligence. Therefore, applications developed in this domain may be in constant flux, due to the never ending demands for automation. Three challenges arise from such automation demands: 1) achieving economical automation, 2) designing the application to enable the rapid deployment of such automation, and 3) the biggest non-technical challenge, which is how to achieve precise articulation of and provenance of resolved issues. To achieve economical automation, it is essential to ensure that data and knowledge about product issues, encountered throughout the product lifecycle (in bug database, support tickets), are captured with precise articulation and provenance. This includes consistent terminology with accurate definitions, accurate and validated causality relationships, system configuration, and personnel's contributions. Such articulation and provenance enables accurate statistics regarding the likely recurrence of an issue and the degree of complexity in recognizing and resolving the issue automatically or semi-automatically. Next, the process may be standardized for diagnosing issues based on provenance data collected. Such standardization may be aimed at establishing standardized data collection, standardized parsing and interpretation of such data, standardized diagnoses, and standardized remediation methods as well as standardization of the entire process of issue resolution.

To achieve robust application architecture that enables rapid deployment of such automation, the automation problem space may be segmented into coherent modular components. To achieve such segmentation, automation complexity of the space may not be uniform. Data collection automation might not be as complex as data parsing automation. Data parsing automation in turn might not be as complex as diagnosis automation. Also, automating the remediation may be more complex and different. Such level shift in automation complexity may provide natural boundaries for breaking down the problem space.

Use Case—Patient Care

Patient care may be a demanding task driven by captured data, observations, knowledge, and procedures; all growing in amount and complexity at an ever increasing pace. When medical sensors go main stream, the amount of data and knowledge is expected to grow at an even faster pace. With the use of sensors doctors will become constantly responsible for all their patients no matter if these patients visit their office or not. While the collection of EMR (Electronic Medical Records)—a mix of data describing measurements, images (and reads), observations, diagnosis, and treatments—is extremely important, these records are by no means sufficient. EMRs neither organize data into meaningful categories nor do they describe who has looked at which data at which time, which diagnosis was derived and why, and if any computerized knowledge and which version was used to come to any conclusions. There are also tremendous cost pressures and the ever looming issue of a malpractice suit, motivated by the negligence of doctors or the greed of patients or lawyers.

Doctors use many methods to care for patients; some of the frequently used terms are: evidence based medicine, standard of care, differential diagnosis, and personalized/precision medicine. There are countless applications supporting doctors; however, they capture only a small part of their tasks; furthermore, they are proprietary and opaque making major extensions, personalization, and fast evolution practically impossible. What is required is a system that helps doctors in all phases of the treatment, allows doctors to communicate with this system in their language, transform measurements into a compact form, provide rigorous provenance, alert of abnormalities, allow major extensions and personalization, and evolve perpetually—this is not an exhaustive list.

Patient care starts with the gathering of evidence, which comes in the form of facts and observations. Facts consist of the measurement such as vitals, the blood chemistry as well as images; measurement facts are quantitative. Using classification, facts are transformed into perceptions, such as the severity of the deviation of a measurement from the norm, and the interpretation of an image. Facts are complemented by observations which are treated as perceptions. The perceptions will be assessed to arrive at one or more diagnoses (hypotheses) determining the root cause of the observed ailment and its associated confidence. The next step is a treatment plan resulting in directives; e.g., a specific treatment and/or more tests—based on standard of care. The enactment of the directives will create more facts and the cycle starts again until the hypotheses show that the target has been reached or nothing should or can be done any more; a differential diagnosis is an example of this. Most of these steps are and will increasingly be computer supported allowing the permanent supervision of patients based on a constant stream of facts. New computerized knowledge has to be used immediately once it has been verified and released. Any support has to be considered in the context of personalization; the application of knowledge has to be based on preferences of individuals or teams. Social networking and tacit knowledge profiling should help to identify the most qualified individuals or teams for a task.

This use case highlights the need of transforming facts into perceptions. There are about ten vitals, with a variety of dimensions and ranges, where the ranges depend frequently on the situation of the patient. Therefore specifying the conditions for notifications may be very demanding. Doctors' deal with this by classifying facts and use the same classifier for many types of facts; potential qualifiers for all vitals are normal, guarded, serious and critical. The goal is to use indeed very few qualifiers to keep things intuitive. Qualifiers help to normalize and simplify queries such as: tell me all patients with at least one critical or two serious vitals. With temporality, doctors add the notion of the evolution of values such as deterioration/improvement. The rate of the change can be used to discuss slow or rapid deterioration. Obviously, one can also discuss the stability of the values such as the vitals of a patient are stable or unstable. Doctors prefer the use of perceptions since it leads to an intuitive and compact language. The fuzziness of the perceptions has to be compensated by rigorous provenance.

In addition to the benefits of classifying single values, there may be even bigger needs for classifying a set of values or images. Here is an example: the risk of a cardiac arrest can be seen in a blood test hours ahead. Unfortunately, this requires understanding a complex interrelation between at least ten values, which is even for the best expert often not doable; computers are good at this. So real-time evaluation of large amount of models may be needed. With this approach doctors could be even made aware of potential risks they never encountered or even know about. Again, rigorous provenance is required to allow doctors to review the classification.

Perception needs to describe the important aspects of the current situation of the patient in a temporal way; after all doctors like to know what is currently going on and how this situation has evolved and is predicted to evolve. Additionally, situation of the past have to be easily available. Predictions in conjunction with classifications should allow doctors to formulate very generic requests such as: tell me if the situation of a patient does not evolve as expected. This request has a specific meaning for a specific situation.

The KIDS Model—Concepts

KIDS provides a model to structure applications focusing on data, knowledge, and process management, for example, see FIG. 9. The management of data is a relatively mature technology, which is currently going through a rapid evolution. KIDS adds to this evolution by defining and managing four distinct categories of data:

Facts are data that can be measured in the world. The number, rate, and quantitative nature of facts make it difficult for the human cogitative system to deal with them directly. Technologies such as CEP and Big Data are focused on capturing and processing these data.

Perceptions are a compact, temporal, and qualitative representation of facts (and observations). It is optimized for use by the human cognitive system; it represents the most important aspects of an evolving situation visible in the facts. Perception depends on the perspective of the consumer of that information.

Hypotheses are descriptions of possible root causes explaining the facts and the perceptions.

Directives describe what needs to be done to react to a specific set of facts, perceptions, and hypotheses. Directives specify action plans often in the form of workflows or processes. Obviously, the directive will most likely influence the evolving facts.

Any of these categories of data may require a wide variety of data types/structures, extensibility, declarative access across data types/structures, time travel, flexibility in evolving data structures (support for well-structured data as well as data first/structure later or never support), OLTP, analytic, and so forth. There also may be a need for extended functionality such as (fine grain) security, provenance, and ILM. Important operational characteristics may include disaster recovery, high availability, reliability, scalability, performance, and rapid development tools. In some cases, the management of data requires such a broad functional and operational support that may be available in mature and widely used databases. The collection and management of facts need not require the classical transaction model and limited loss of data may be acceptable. Mature databases may optimize the management of facts and provide support with significantly reduced resource consumption.

In certain embodiments, knowledge may be divided into four categories of Classification, Assessment, Resolution, and Enactment complementing the four data categories. These categories are based on the mode of reasoning that is required to process each category of data. A substantial subset of each category of knowledge can be automated by suitable computation models.

The Classification knowledge—transforming data into perceptions—is primarily represented by deductive reasoning mode. Some Classification knowledge that produces prediction or norm may involve inductive reasoning as well. The computation model for classification includes Support Vector Machines, Naïve Bayesian Network, Neural Network, Clustering, Association Rules, Decision Trees, Multivariate State Estimation Technique, Cognitive computing, etc.

The Assessment knowledge—transforming perceptions into hypotheses—is typically implemented by abductive reasoning that derives the Hypotheses from Perception. The computation model for assessment includes Bayesian Belief Network and Least-Squares Optimization or Regression of solutions for inverse problems.

The Resolution knowledge—transforming hypotheses into directives—involves making decisions under the uncertainty of outcomes by considering the relative merit of the different outcomes and the associated payoffs/costs. The computation model for resolution includes Bayesian Belief Network extended with decision nodes and payoff/cost nodes, known as Influence Diagrams, Dempster-Shafer theory, Decision Trees, and Prognosis of Remaining Useful Life.

The Enactment knowledge—transforming directives into action (and new facts)—involves control structures encoded in scripts, plans, schedules, BPEL workflows, and business processes in BPMN.

Knowledge may be applied in the proper sequence as specified by the CARE loop. In some cases not all steps of the CARE loop need to be executed. Knowledge—including each version of it—may be stored in databases to provide full provenance and allow sophisticated query access. Knowledge may be applicable ad-hoc and in real time. One use case is the ability to revisit data (especially facts and perceptions) with new knowledge to find out what has been missed and has been overrated.

Using Big Data/CEP in the context of KIDS may lead to a much more comprehensive and systematic approach:

- Queries/models are treated as knowledge and not as individual elements; knowledge can be queried and evolved.
- Data as well as knowledge (queries, rules, and models) are associated with each other in four categories with specific characteristics.
- The transformation of facts to perception is complemented by actions to react to situations.
- Provenance support is unambiguous to document which version of the knowledge has been applied to derive which version of the data.

Additionally, each category of formal knowledge may be complemented by human tacit knowledge. Applications may also require social networking services where we can profile the tacit knowledge and social preferences of the actors in the system. This may allow identifying the most qualified individuals or teams for a task by adjusting the tacit knowledge profiles based on recent activities to ensure that profiles are as up-to-date as possible.

In some embodiments, applications may include the ability for continuous improvements. This can best be done by continuously improving the knowledge. Techniques for enabling continuous improvements include:

- Improve the rules, queries, models, and code by leveraging insights from users and domain experts.
- Re-characterize and rerun the models using additional data or new algorithms.
- Knowledge may be exchanged between experts of a field; this exchange may be as formal as possible. Papers may be considered as the equivalent of Venn Diagrams helping to understand intuitively models or whatever formalism is used. Any new knowledge may be carefully reviewed before it is generally used. KIDS may allow the use of evolving and existing knowledge concurrently and is able to show both results. KIDS also may be able to review existing data with new knowledge, indicating new risks and opportunities as well as previously overrated risks and opportunities.

The KIDS Formal Model

KIDS may include an engine that propels the interaction of the human actors, the computer programs or hardware devices (agents) that act on behalf of the human actors, and/or the entities being observed, diagnosed, and treated. The formal model of KIDS may inform the implementation of a process management application that drives the interactions among the actors, agents, and entities in the system to actively manage the information changes in the system.

The formal model of KIDS may be represented in the multi-temporal database systems. Any piece of data in the model may be assumed to have a transaction time (TxnTime), although the transaction time may not be explicitly represented in the model. One exception to this rule is the Activity context for which the transaction time is explicitly represented to support flashback query and provenance.

The valid time (ValidTime) may explicitly represented in the FSD and Feature data, two of the basic data structures in the formal definition:

FSD $\subseteq$ Entity×Value×ValidTime×FSDType
Feature $\subseteq$ Entity×Value×ValidTime×FeatureType
Vector={Feature$^n$|n=1, 2, ... , N}
BigVector={FSD$^n$|n=1, 2, ... , N}∪Vector.

An FSD (Flexible Schema Data) may be any extensibility data in the database, including text, audio, video, spatial, graph, XML, RDF, and JSON. Thus an FSD may represent a file and depending on the associated FSDType, the file can contain an electrocardiogram, X-Ray, CT scan, MRI scan, etc., in the Patient Care domain and a thread dump, a heap dump, a database AWR snapshot, a database trace, etc., in the cloud operation and software and hardware product support domain. A Feature may represent a categorical value, such as low, normal, high, in a range of observations of a symptom or disease, and depending on the associated FeatureType, the symptom or disease may represent respiratory tract infection, acute bronchitis, asthma, etc., in the Patient Care domain and hypertension, hypotension, impedance mismatch, convoy effect, etc., in the cloud operation and software and hardware product support domain.

ValidTime and TxnTime are time intervals. A time interval denoted by [t1, t2) is a set {t|t>=t1 and t<t2 and t1<t2, where t, t1, t2 ∈ DateTime}. An instantaneous time t1 can be denoted by [t1, NA). Two valid times [t1, t2) and [t2, t3) can be joined into one valid time [t1, t3).

ValidTime=[DateTime, DateTime ∪ {∞. NA})
TxnTime=[DateTime, DateTime ∪ {∞. NA})

KIDS system may be a 7-tuple (Actor, Agent, Entity, CARE, Metadata, Context, Profile). Actor is a set of human actors and Agent is a set of computer programs or hardware components that act on behalf of human actors. Entity is a set of entities being observed, diagnosed, and treated.

CARE=(Data, Knowledge)
Data=(Fact, Perception, Hypothesis, Directive)
Knowledge=(Classification, Assessment, Resolution, Enactment)
Data is represented in terms of two basic data structures FSD and Feature:
Fact $\subseteq$ Guard×Activity×Entity×BigVector×ValidTime
Perception
  $\subseteq$ Guard×Activity×Entity×Vector×ValidTime×FoM
Hypothesis
  $\subseteq$ Guard×Activity×Entity×Vector×ValidTime×FoM
Directive
  $\subseteq$ Guard×Activity×Entity×Vector×ValidTime×FoM
Situation=Fact∪Perception∪Hypothesis∪Directive
Situation may be a generalization of Fact, Perception, Hypothesis, and Directive. A Situation instance is associated with a specific Activity instance in a CARE-Loop instance, and represents the input or output of a KFun function associated with the Activity instance. A Situation instance may be associated with an Entity and contains a vector of FSDs or Features that can be part of the states of the related Entities, i.e. the Entity in a Situation can be related to the Entity of each of the FSDs or Features in the Situation by valid JPQL path expressions. FoM is a figure-of-merit quantitative or qualitative value representing confidence level, confidence interval, probability, score, root mean square error, payoff/cost, etc.

Knowledge may be represented in terms of functions that transform one type of data to another type. Let f:Vector→Vector denote a function, Situation ◁ f denote a restriction of domain(f), and f▷ Situation denote a restriction of co-domain(f). For example, the function Fact ◁ f▷ Perception, whose domain(f) is restricted to BigVector's of Fact and co-domain(f) is restricted to Vector's of Perception, maps care-loop[k].classify.fact. bigVector to care-loop[k].classify.perception.vector for a given care-loop and a loop counter k.

Kfun=Classification∪Assessment∪Resolution∪ Enactment∪SymptomResolution
Classification $\subseteq$ {Fact ◁ f▷ Perception|f:BigVector→Vector}×ValidTime
Assessment $\subseteq$ {Perception ◁ f▷ Hypothesis|f: Vector→Vector}×ValidTime Resolution ⊆ {Hypothesis ◁ f▷ Directive|f:Vector→Vector} × ValidTime Enactment ⊆ {Directive ◁ f▷ Fact|f:Vector→BigVector} × ValidTime SymptomResolution ⊆ {Perception ◁ f▷ Directive|f:Vector→Vector} × ValidTime Kfun is a generalization of Classification, Assessment, Resolution, Enactment, and SymptomResolution.

MetaData=(CARE-LoopType, ActivityType, FSDType, FeatureType, KfunDefinition).

CARE-LoopType ⊆ Name

ActivityType ⊆ Name

FSDType ⊆ Name × EntityType × Encoding × Language

FeatureType ⊆ Name × EntityType × AllowedValues

KfunDefinition=(PreCondition, PostCondition)

PreCondition ⊆ FilterDefinition" × Kfun

PostCondition ⊆ Kfun × FilterDefinition"

FilterDefinition
  ⊆ (FSDType ∪ FeatureType) × Filter × Mandatory

PreCondition and PostCondition metadata capture the influence relations among the Kfun functions to detect when a set of FSDs and Features (for a related set of Entities) becomes simultaneously valid and satisfies the Situation needed to invoke a Kfun function. Filter is a predicate defined in terms of JPQL path expressions. Mandatory is a Boolean expression that specifies that the corresponding FSDType or FeatureType must be part of the input or output Situation in order to invoke the Kfun.

Context is a 5-tuple (CARE-Loop, Classify, Assess, Resolve, Enact).

CARE-Loop=CARE-LoopType × Entity × Actor × Counter × (Classify × Assess × Resolve × Enact)"

A CARE-Loop instance may be a closure of a sequence of Activities and together with each of its Activity instances represent the contexts for evaluating the Filter's defined by the CAREDefinition. Counter is a loop counter ranging from 0 to n that is part of the state of the CARE-Loop instance.

Classify
  ⊆ ActivityType × Fact × (Classification)" × Perception × Actor × TxnTime × ValidTime Assess ⊆ ActivityType × Perception × (Assessment)" × Hypothesis × Actor × TxnTime × ValidTime Resolve ⊆ ActivityType × Hypothesis × (Resolution)" × Directive × Actor × TxnTime × ValidTime Enact ⊆ ActivityType × Directive × (Enactment)" × Fact × Actor × TxnTime × ValidTime A Classify, Assess, Resolve, or Enact instance may represent an execution context, respectively, of a Classification, Assessment, Resolution, or Enactment function.

Activity=Classify ∪ Assess ∪ Resolve ∪ Enact.

Activity=ActivityType × Situation × (KFun)" × Situation × Actor × TxnTime × ValidTime Activity may be a generalization of Classify, Assess, Resolve, and Enact. Many Activity instances (each with a pair of input/output Situation instances) may be associated with the same KFun function. Guard may be a query composed from a set of Filter's specified in terms of JPQL path expressions and Mandatory Boolean expressions, which are evaluated in the context of a CARE-Loop instance or an Activity instance.

Profile is a triple (ActorProfile, KnowledgeProfile, AcivityAssignee, Personalization).

ActorProfile ⊆ Actor → Entity × Feature" × ValidTime × FoM

KnowledgeProfile
  ⊆ Kfun → Entity × Feature" × ValidTime × FoM

ActivityAssignee ⊆ {f|f: Activity → Actor} × ValidTime

Personalization: Kfun × Actor → Kfun

Personalization can be interpreted in terms of the curry operator:

Personalization(Kfun,Actor)≡curry(Kfun)(ActorProfile (Actor))

The KIDS Execution Model

In this section, one or more embodiments of the KIDS execution model are described. A CARE-Loop instance may be a closure of a sequence of Activities (Classify, Assess, Resolve, and Enact). It may provide the historical and intentional context comprised of Activities that has happened in the past, Activities that are current or going on in the present, and Activities that are supposed to happen in the future. For each CARE-Loop instance, KIDS may maintain a loop counter. An Activity instance may be current if it is supposed to be executed under the current loop counter. The current Activity instances are supposed to be executed when the input Situation for the Activity instances are substantively changed. The loop counter is incremented when all current Resolve activity instances under the current loop counter are executed.

A CARE-Loop instance may have an instance type and an instance owner. The instance type groups the similar CARE-Loop instances and can be used to customize or constrain the Activity instances carried out within the CARE-Loop instances. The first time a CARE-Loop type is specified, an Actor (he/she who instantiates the first instance of the type or another Actor whom he/she designates) is associated with the type as its owner. Each Activity instance of a CARE-Loop instance has an assignee Actor who is eligible to carry out the Activity instance. In the absence of an Activity instance assignee the CARE-Loop instance owner becomes the Activity instance assignee. Also, in the absence of an explicitly specified CARE-Loop instance owner, the type owner becomes the instance owner by default. An instance owner or an Activity instance assignee can be computed by a specified function among ActivityAssignee. Such a function is defined in terms of the path expressions evaluated in the context of a CARE-Loop instance or an Activity instance in the CARE-Loop instance.

The owner of a CARE-Loop instance type may be permitted to constrain the behavior of all instances of a type. The owner of a CARE-Loop instance also may be permitted to further customize the behavior of the instance within the constraints specified by the type owner. The CARE-Loop instance owner can define new Activity instances of the CARE-Loop instance on the fly by creating the initial Activity instance and any subsequent Activity instance. The CARE-Loop instance or type owner can also create new FSDType's or FeatureType's to build the CAREDefinition metadata before creating the FSDs or Features for the Situation instances of an Activity instance. Any Activity instance can be implemented by an encoded knowledge function (SVM, MSET, BBN, etc. machines) which is also defined with the aid of CAREDefinition metadata; some examples of CAREDefinition are depicted in FIGS. 11A-11E.

An Activity instance may be uniquely identified within a CARE-Loop instance by an index, e.g. the index i=0 . . . n in care-loop[i].classify, care-loop[i].assess, care-loop[i].resolve, and care-loop[i].enact. The state of a CARE-Loop instance includes the conglomeration of the FSDs and Features in the Situation instances associated with the Activity instances in the CARE-Loop instance, i.e. the FSDs and Features that can be accessed by the path expressions, e.g. "care-loop[2].classify.perception.feature['Average Memory Usage'].entity." Many Activity instances can be associated with a Kfun function and a CAREDefinition metadata of the Kfun function. KIDS can select the current Activity instances that are supposed to be executed under the current loop counters. The execution of the current Activity instances is controlled using a Guard specified in each Activity instance. A Guard includes a set of Filter predicates specified in terms of the path expressions and Mandatory Boolean expressions. Path expressions, such as "care-loop[1].resolve.directive.feature['Allocate More Memory'].value" or "perceptionleature[' Memory Usage Spiking'].value," are evaluated in the context of a CARE-Loop instance or an Activity instance in the CARE-Loop instance. When an Activity instance becomes current, KIDS uses the corresponding Guard to compose a SQL query statement. The result of such a query is a Situation (Fact, Perception, Hypothesis, or Directive) instance. The query can be registered for object change detection. When any FSD or Feature is updated or inserted, KIDS executes a flashback query of each registered query statement as of the last transaction time recorded by TxnTime in the corresponding Activity instance. It also executes a query as of the current transaction time. If the Situation instance changes substantively between the two transactions, KIDS activates the Activity instance with the updated Situation. This can be the invocation of the Kfun function associated with the Activity instance. After the invocation of the Kfun function and the input and output Situation instances are committed, KIDS will save a new transaction time (TxnTime) in the Activity instance. KIDS will defer the invocation of the Kfun function until all mandatory FSDs and Features are part of the input Situation. Thus KIDS orchestrates the execution of the CARE-Loop Activity instances to advance the CARE-Loop counter.

SituationDefinition may contain a list of FilterDefinition's each of which specifies the FSDType and FeatureType of the FSD or Feature in the Situation. Each FilterDefinition also specifies the Filter predicates, such as "'YAK-dom0.12-OVM.222'=feature.entity.oracleVM AND feature.name='ESS Process Spik-ing'." The Filter predicates specified in the FilterDefinition can be used to register an expression in an Oracle Database Expression Filter table to select the registered query statements that may be affected by a new or updated FSD or Feature in the current transaction. KIDS executes the flashback query only for the affected query statements to detect the changes of Situation instances. The use of path expressions in the Filter allows the FSDs and Features of a related set of Entities to be aggregated in the Situation instance. The path expressions must be valid for the given Entity Model.

If KIDS detect changes to the input Situation instances for more than one current Activities under a current loop counter, it may select one Activity to execute according to the precedence rule Classify<Assess<Resolve<Enact. The current Activities may be executed repeatedly as their input Situation instances change until the execution of one or more current Resolve activity instances bumps the loop counter and a new set of Activity instances become active. It is also possible to reset the loop counter to a lower number in order to re-evaluate the Situation instances and re-execute the Activity instances using newer versions of Kfun functions.

Thus, KIDS engine may be implemented using mature database technologies for large-scale state management, rich data models and data types, expression filters, flashback queries, and registered queries.

Experiences of KIDS—Cloud Operation

Figure 12:
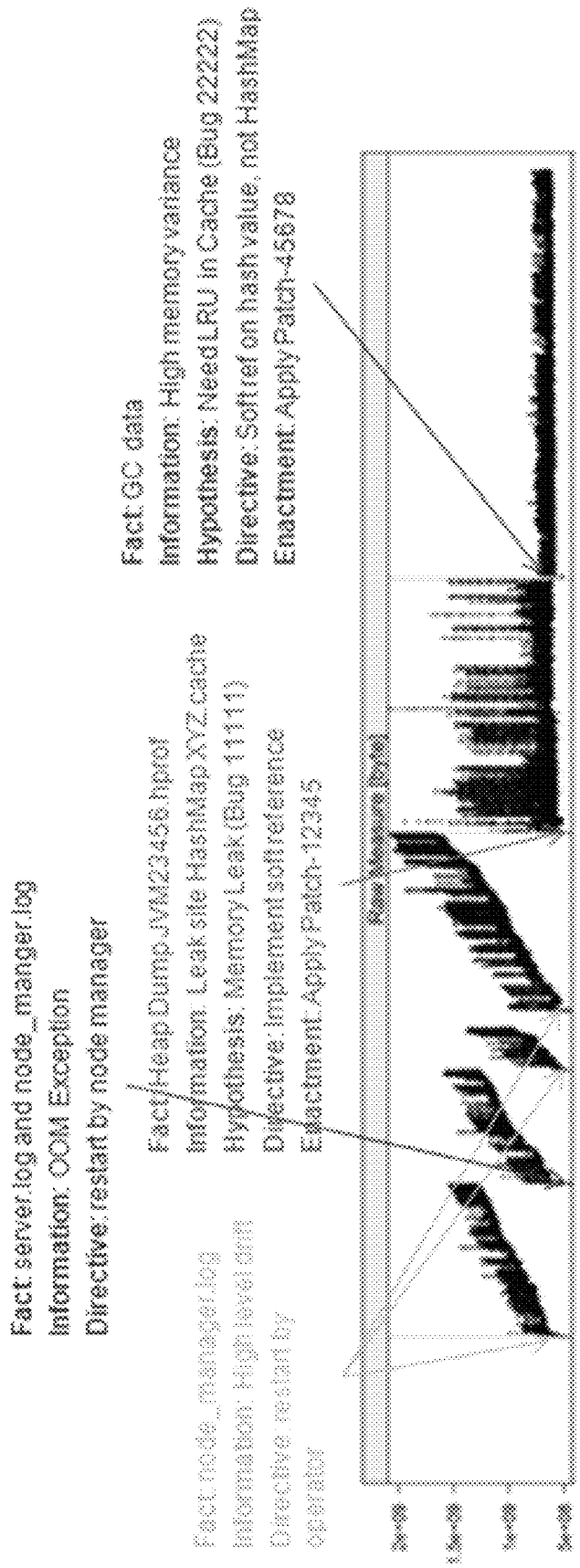
FIG. 12 is a block diagram illustrating annotated FPHD and CARE data in an exemplary KIDS loop, according to one or more embodiments of the present invention.

The KIDS engine may orchestrate the interaction of various inference engines, such as BBN, RETE, MSET, SVN, etc., discussed above. KIDS database may annotate the FPHD and CARE data in the fact data to materialize the KIDS loops in the data for provenance, as shown in FIG. 12. KIDS model may bring together big data systems for log analytics and real-time enterprise management systems in the IT operations, the two represent the big data and CEP that were disconnected and surrounded by islands of automation. KIDS model may enable information fusion of dynamic entity model, log analytics, and real-time monitoring to enable a faster OODA loop in real-time.

Figure 13:
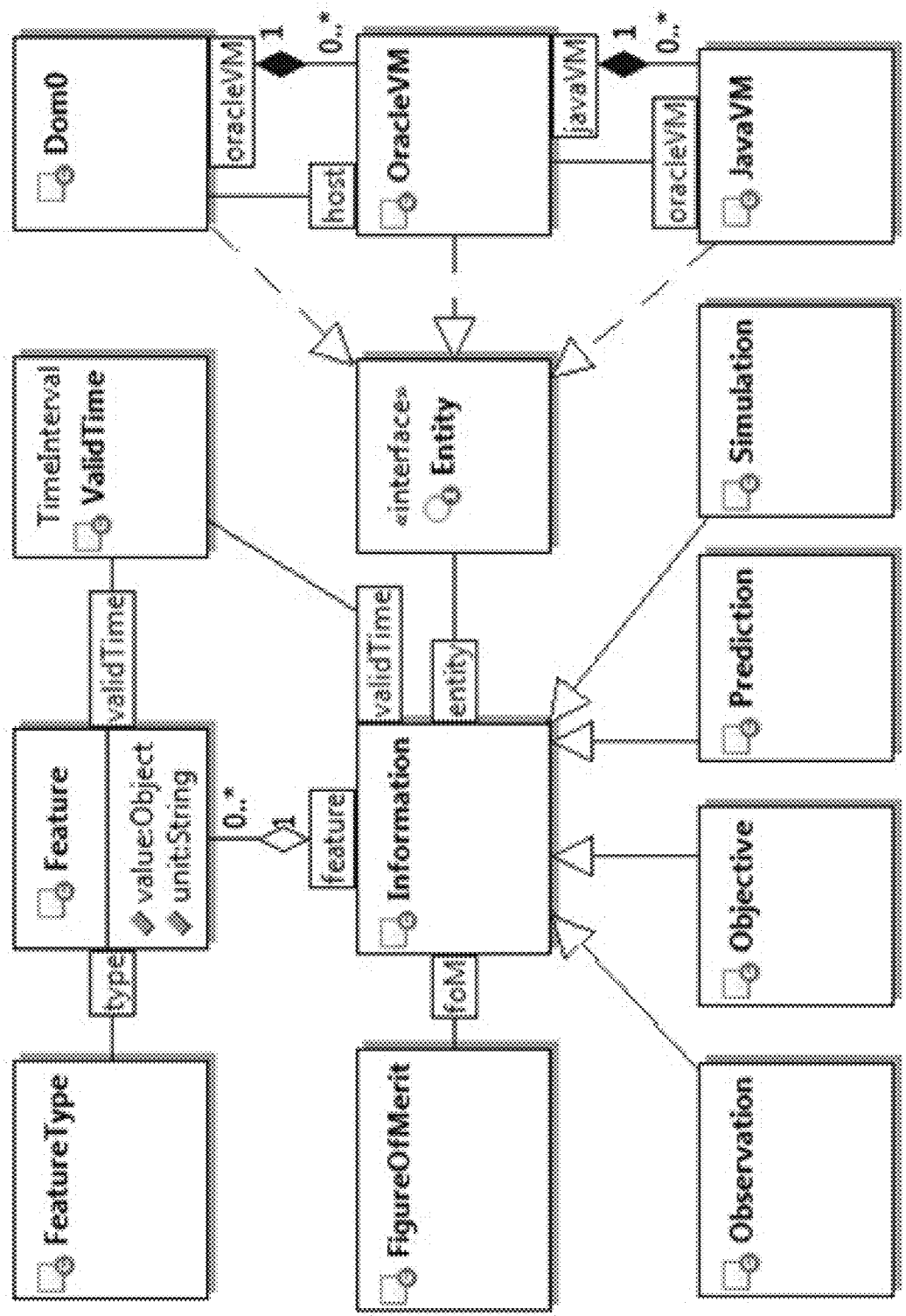
FIG. 13 is a block diagram illustrating an information fusion of various types of information across a related set of entities, according to one or more embodiments of the present invention.

KIDS model enables information fusion across various special types of Perception, such as the Observation, Objective, Prediction, Simulation, etc., deduced by different classification knowledge, and across related entities. In the example scenario of information fusion in FIG. 13, the related set of entities whose information converges includes the OracleVM, its JavaVM's, its Dom0 host, and the other OracleVM's and JavaVM's in the Dom0 host. The dynamic entity model is managed by a temporal database.

Figure 11A:
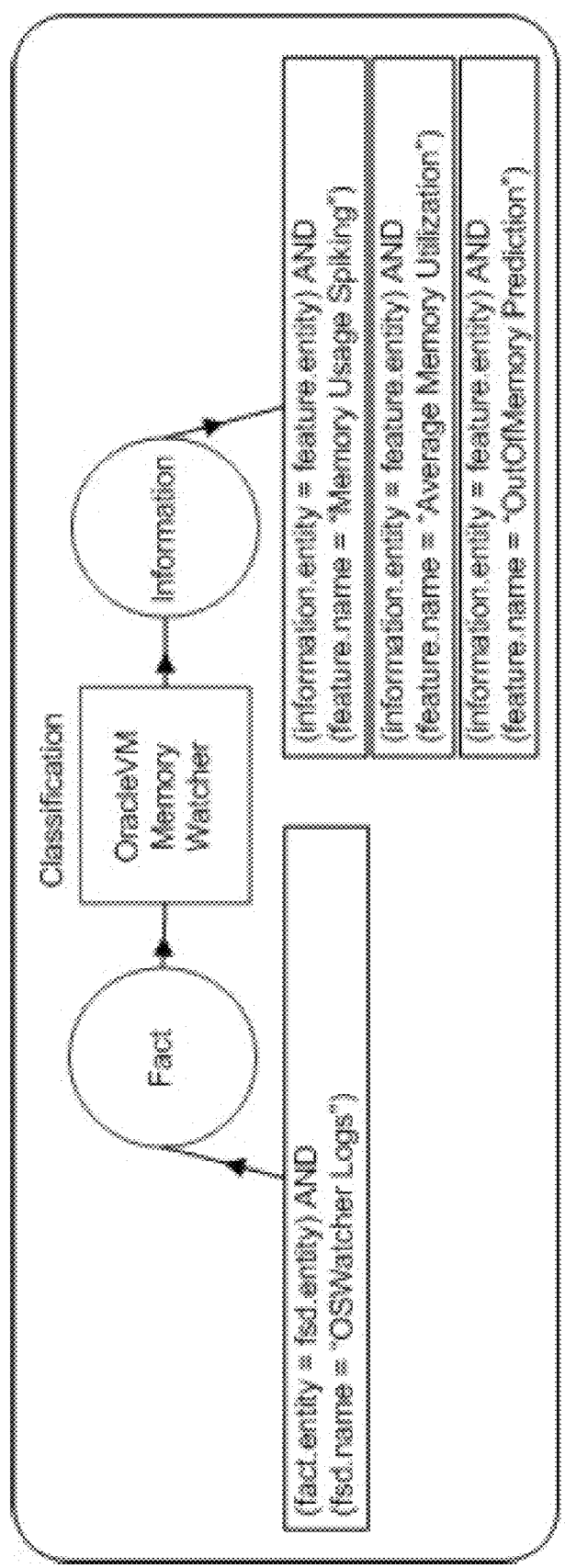
FIGS. 11A-11E are block diagrams illustrating CARE-Definition examples, according to one or more embodiments of the present invention.
Figure 11B:
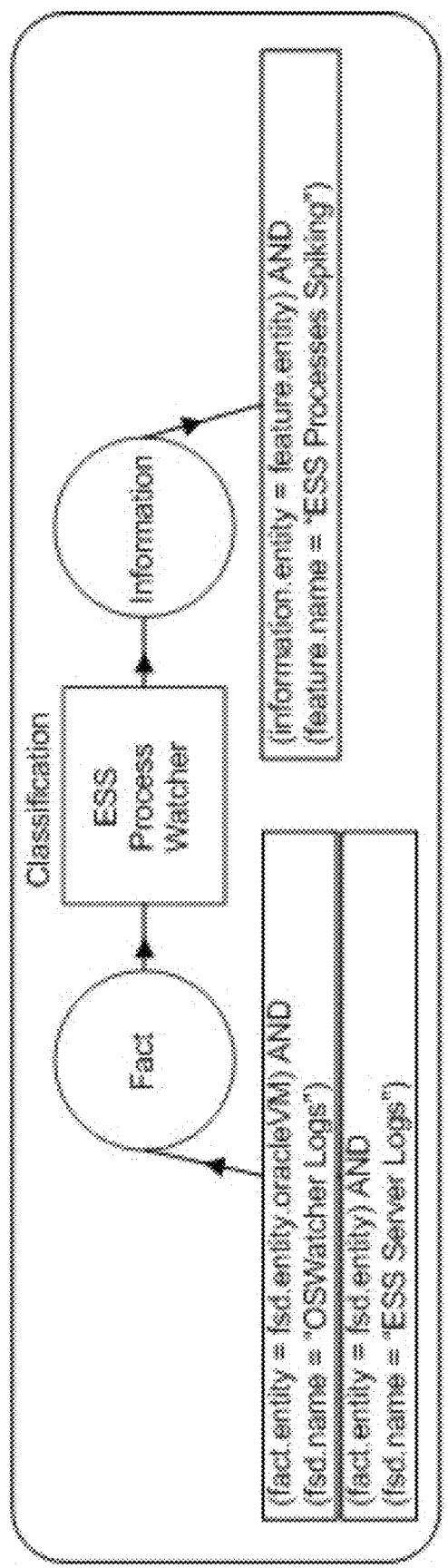
Figure 11C:
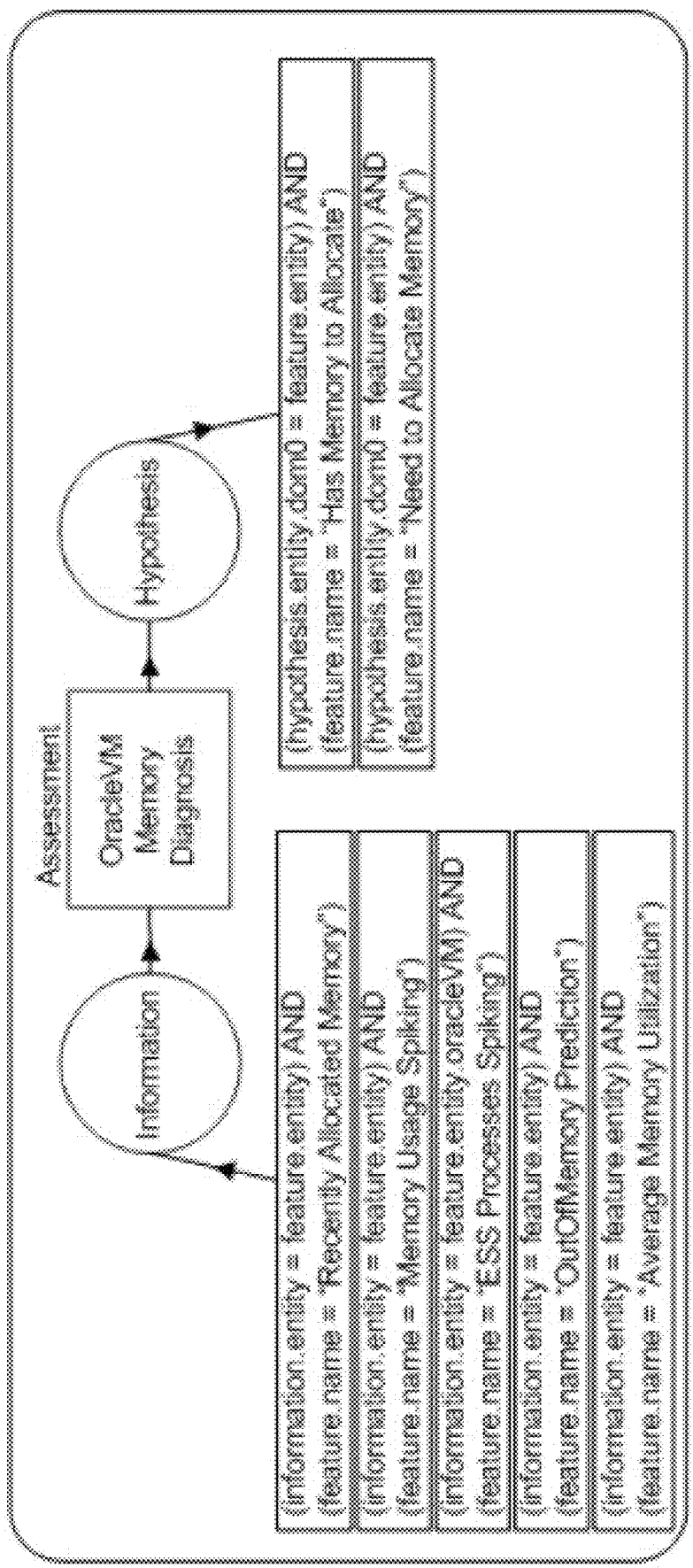
Figure 11D:
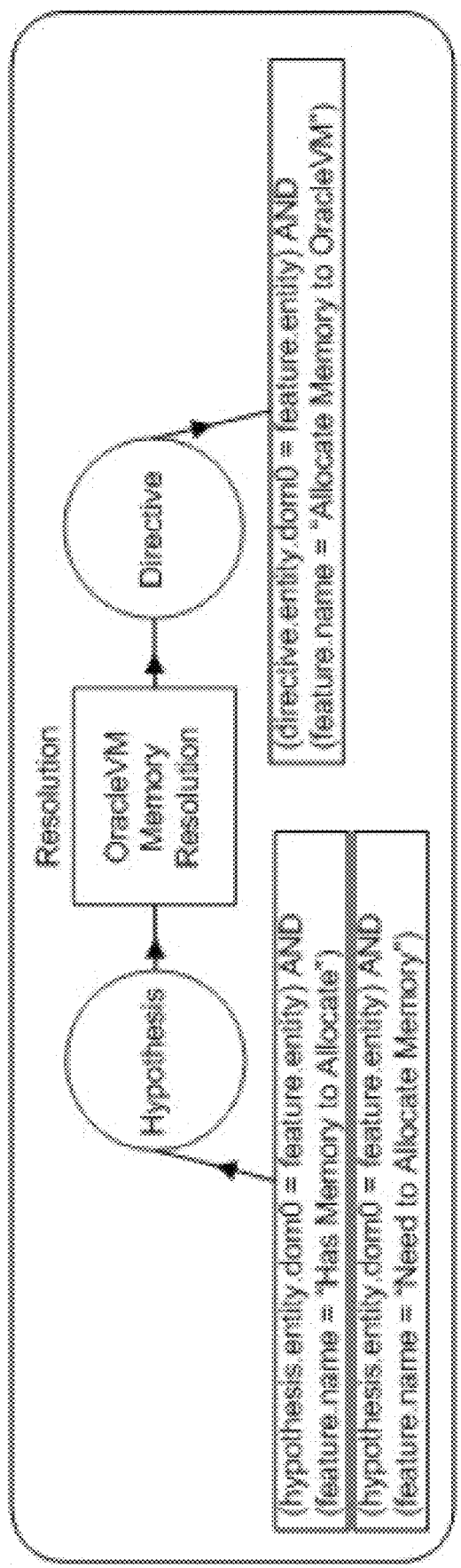
Figure 11E:
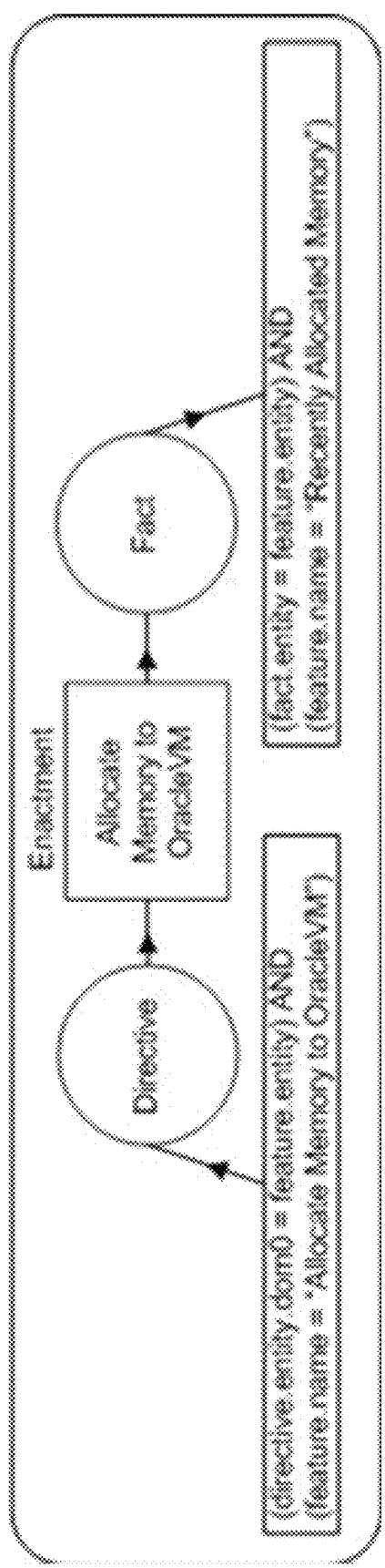

In the example scenario in FIGS. 11A-11C, the "Memory Usage Spiking" and "Enterprise Scheduler Service Processes Spiking" features may be part of the classification of anomalous trends in the measurements of OS memory and OS processes. The feature "Out of Memory Prediction" in FIGS. 11A and 11C is part of the Perception produced by a time-series filter. Additional features such as "Can Compact Heap of JVM's in other OracleVM's" and "Can Reclaim Memory from other OracleVM's," are part of the Perception forecasted by roll-up operations on the data cubes that include average load and seasonal trend data for all JavaVM's in all OracleVM's in the Dom0. KIDS Entity model enables situation awareness based on "the inventory of the OracleVM's running in Dom0" and "the inventory of JavaVM's running in each of these OracleVM's" and the classification perception regarding "Can Compact Heap of JVM's in other OracleVM's" and "Can Reclaim Memory from other OracleVM's," all of which must coincide in a common valid time interval in the Situation instance.

Figure 14:
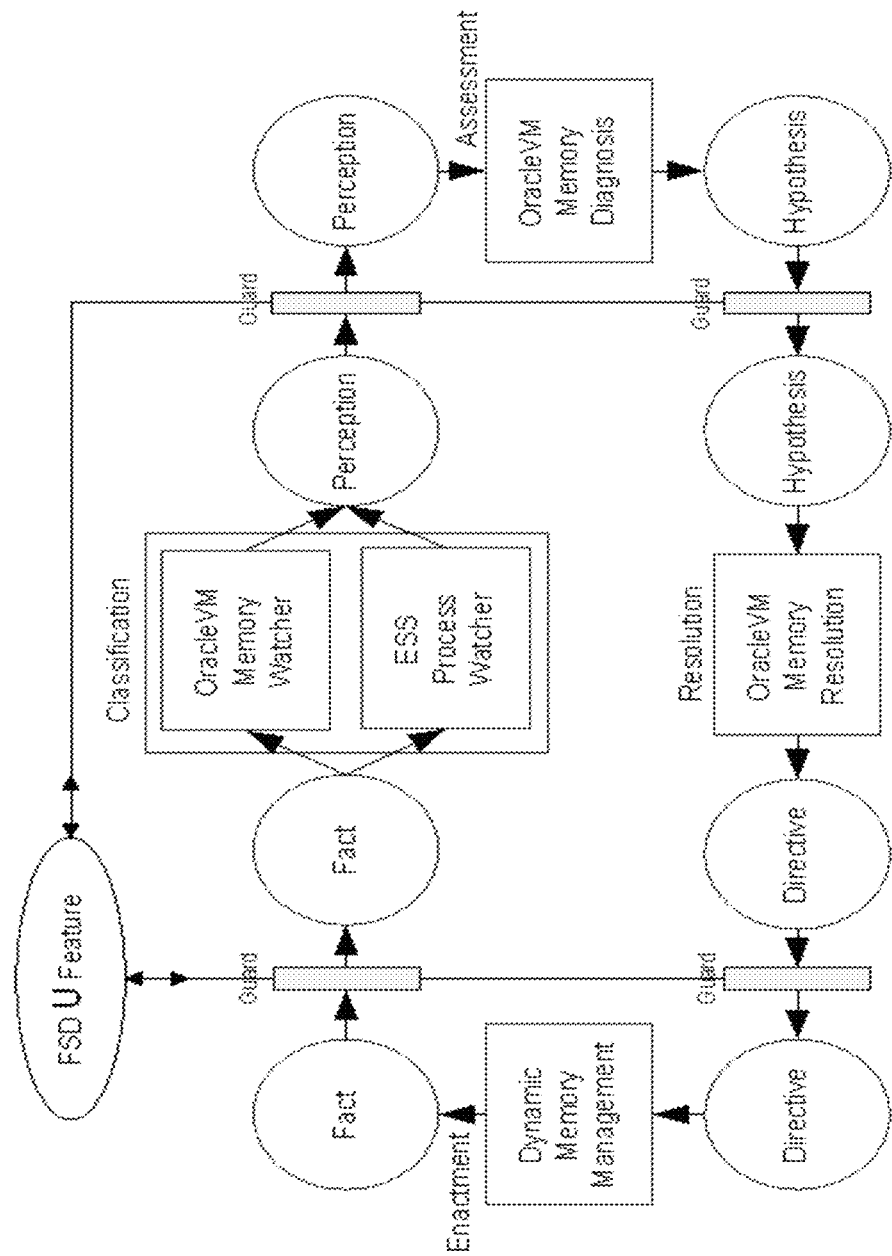
FIG. 14 is a block diagram illustrating an implementation of a CARE loop according to one or more embodiments of the present invention.

The KIDS model may capture the interaction structure of Knowledge functions implemented in various inference engines. The CARE-Loop depicted in FIG. 14 is practically a network of networks, by that the interaction resembles a Petri-Net (Activity and Guard instances are transitions, Situation instances are places, and FSDs and Features are tokens). An Activity instance for an Assessment function is implemented by the Bayesian Belief Network depicted in FIG. 15. Using the interaction model, KIDS can orchestrate the execution of the models involving various inference engines.

Figure 15:
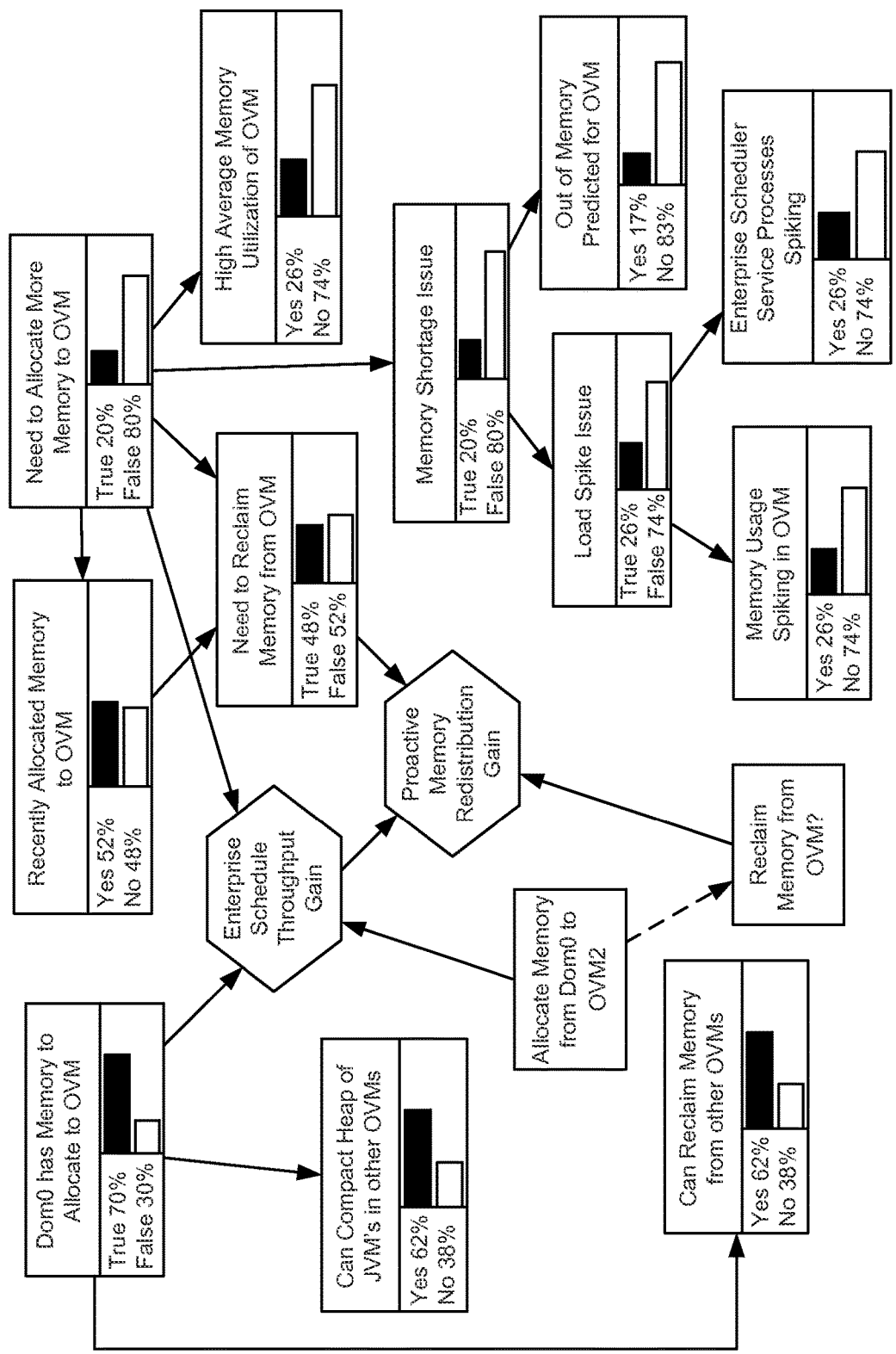
FIG. 15 is a block diagram depicting a Bayesian Belief Network corresponding to an assessment function, according to one or more embodiments of the present invention.

The assessment knowledge "OracleVM Memory Diagnosis" represented by the BBN in FIG. 15 may diagnose the given Perceptions and derives the Hypotheses "Dom0 has Memory to Allocate to OracleVM" and "Need to Allocate More Memory to OracleVM." The same network includes the resolution knowledge "OracleVM Memory Resolution" that combines the Hypothesis to arrive at the Directive for Dom0 to "Allocate Memory from Dom0 to OracleVM." After the ESS jobs are processed the assessment knowledge may arrive at the Hypothesis "Need to Reclaim Memory from OracleVM." The resolution knowledge represented by the influence diagram will arrive at the Directive for Dom0 to "Reclaim Memory from OracleVM." The directive to "Allocate Memory from Dom0 to OracleVM" is implemented by an enactment function that triggers the full garbage collection (GC) and heap compaction in the JavaVM's running in the other OracleVM's in the same Dom0. After the JavaVM's heap compaction, the enactment function can command the Dom0 to inflate the memory balloons (part of the memory over commitment mechanism) in the other OracleVM's to reclaim the memory in the balloons. Dom0 can then allocate the elastic memory to OracleVM to support the processes spawned by ESS. Since the ESS processes are scheduled activities that may exhibit seasonality, KIDS's reactive and predictive responses with the enactment functions will become part of the seasonal activities.

Experiences of KIDS—Software and Hardware Product

Below is a summary of a knowledge elicitation and automation experience for a KIDS design showing how modular product support troubleshooting activities may be mapped to CARE-Loop while striking a balance between the personal productivity of involved personnel and the precise articulation of knowledge and provenance that lead to economical terminology and process standardization and eventually to knowledge automation and *agile* application evolution. Such approaches may provide significant contributions to fostering a collaborative and productive community of practice.

In the following scenario, either automatic incident or customer manual action instantiates a new CARE-Loop instance starting with loop index i=0. The process consists of 4 phases: Identifying the issue, verifying the issue, determining the cause, and offering a solution.

Issue Identification phase (II-i)
Directive(II-i) is an action plan to elicit data about the issue from customer personnel or collect telemetry data and produce Fact(II-i) as answers to the questions or collection of metric values.
Fact(II-i) is classified into Perception(II) known as observations.
Perception(II-i) is assessed into Hypothesis(II-i) known as potential issue.
Hypothesis(II-i) is resolved into Directive(IV-i+1) known as initial data collection action plan.
Issue Verification Loop (IV-i)
Enactment of the Directive(IV-i) produces Fact(IV-i) which is a set of log and trace files.
Fact(IV-i) os parsed (classified) into Perception(IV-i)—a set of observations.
Perception(IV-i) is assessed into a Hypothesis(IV-i)—issue verified or not.
If issue verified then proceed to Cause Determination by producing Directive(CD-i+1) to determine the cause (fault condition) else revisiting Issue Identification by producing Directive(II-i+1).
Cause Determination Loop(CD-i)
Directive(CD-i) is enacted producing Fact(CD-i) in the form of additional log and trace files, and configuration data.
Fact(CD-i) is parsed into Perception(CD-1)—additional observations.
Perception(CD-i) is assessed producing Hypothesis (CD-i) known as fault condition.
If Hypothesis(CD-i) is found with high confidence, then produce Directive(SP-i+1) (a solution action plan) else produce Directive(CD-i+1) to collect additional data to further the investigation of the potential cause.
Solution Plan Loop (SP-i)
Directive(SP-i) is a set of actions to rectify issue caused by hypothesized cause and to collect additional data to verify the solution are enacted producing Fact(SP-i).
Fact(SP-i) is parsed into Perception(SP-i)—solution's observations.
Perception(SP-i) is assessed producing Hypothesis(SP-i) indicating whether the solution is verified to rectify the issue or not.
If the Hypothesis(SP-i) verifies the solution then provide CARE-Loop Closure in the form Directive(NO-OP-END) else revisit the cause determination by producing Directive(CD-i+1) or attempt a new solution by producing Directive(SP-i+1).

Any activity in the above specialized CARE-Loop, may be manual, partially or fully automated depending on the maturity of the process and explicit knowledge of the support team owning the loop as well as the complexity of the domain. KIDS Analytics services are utilized to qualify manual activities that are ready for partial or full automation. Such activities must have reached sufficient maturity and have an economically sound ROI to automate. Automating data collection was accomplished through diagnosability framework embedded in the product to achieve first failure data capture of critical issues as well as on demand instrumentation for getting deeper insight. To achieve rapid deployment, automation components are specified in a declarative way and the testing is fully automated to ensure quick turnaround of such automation. KIDS plug-in framework is utilized to include domain specific services and knowledge such as domain specific ontology repository, XML based diagnostic data parsing framework that supports automated testing framework of parse modules. Automating data parsing is achieved through the transformation of collected data into a canonical representation in XML and specifying the data parsing rules in XPATH rules. A library of reusable data parsing patterns in Java may be developed for complex pattern that cannot be easily specified in XPATH. For automating diagnoses, manual modeling, is the only viable approach for automation. Also KIDS plug-in framework is utilized to include Bayesian Belief Network based modelling, automated testing, and automation framework. As a matter of fact, KIDS CARE-Loop is also utilized for constructing and testing such models. Bayesian Belief Network (BBN) may be used to model diagnoses. BBN provided the ideal paradigm due to the sparse nature of the issues space which hindered machine learning. BBNs may be built that help explain how such diagnoses are arrived at, and to handle incomplete and out order input data.

KIDS also may be used for personal productivity services to support personal productivity in manual activities in the form of guided tagging and hash-tag expansions, and inline action plan specification, as well as leveraging guided tagging to enable terminology standardization, with hash-tag expansion to define personal terminology. KIDS also may be sued for exploring inline action plan specification for capturing and sharing action plans, and self-service personal data parsing automation to capture and allow sharing of data parsing rule sets. These various examples may provide personal empowerment on one hand and enable community sharing and collaboration on the other. For example, tagging enables the organization and search of personal knowledge, while guided tagging enables community convergence on a standardized set of tags. Also, the hash-tag expansion user experience service aims at helping to specify a text boiler plate or a term definition once and reuse multiple times on a personal level, while enable a community to share such definitions. Finally, inline action plans, the creation of reusable action plans on a personnel level, but also enables the actor of such action plan to utilize it as a checklist. On a community level such action plans can be shared and exchanged. All such user experience services are intended to support personal empowerment while helping a community of practice to converge on best practices and common terminology.

Experiences of KIDS—Patient Care

The focus of the patient care KIDS projects may be on classification and provenance. To support provenance all patient records were managed in a transaction temporal database. The classification may be done with registered queries and with models. Classification may be adjusted by doctors down to the level of individual patients; reducing false alarms. For vitals the classifications of normal, guarded, serious, and critical were used. Registered queries may be expressed using these classifications. As a result, doctors may define rules in their language such as: notify me if at least one vital of patient X is critical for over 2 minutes. Since such rules may be independent of the classification specifics, a small amount of rules may be sufficient and the rules may be stable.

Additionally, a non-hypothesis driven model may be used to predict the probability of a cardiac arrest looking several hours into the future. A surprising result may be that the vitals, typically the most up-to-date data available, were only of minor importance for long-term' prediction. Such KIDS techniques also may show that events or not a good end-user abstraction. The term incident object may be used; the idea may evolve to the situation (state) model. Some embodiments may cover only the management of facts, classification, and perceptions. The other elements of the CARE-loop may be added after such projects are completed.

KIDS Database Specifications

In some embodiments, a database used to implement a KIDS model may meet certain requirements or specifications. In some cases, a KIDS database may provide a declarative query language to allow users to query CARE-Loop instances. SQL may be used to provide a declarative language model. However, SQL only queries set of atomic data. To query KIDS, SQL may need to be extended to query set of CARE-Loop instances. SQL may query linkage among data using primary/foreign key relationship, but may be limiting for query of CARE-Loop instances and Activity instances, which may involves recursive graph traversal. The closest support for graph traversal declarative construct in SQL may be recursive query. However, the recursive query may provide final results in tabular form instead of the result derived from the original recursive structure. KIDS query language may therefore allow users to query and traverse the CARE-Loop paths to see how an Activity instance is dependent on the Situation instance and how a Kfun knowledge function is applied.

Additionally, a KIDS database may provide a declarative manipulation language to manipulate KIDS elements. CARE-Loop may keep track of what has happened. However, a DML may allow a user to predicate what would have happened or what will happen if the user modifies the knowledge in certain ways, i.e. 'what if query' capability. In this way, users may be able to evaluate historical data using new knowledge to get new insights of historical data. This is like a time traversal to the past. Furthermore, users shall be able to predicate future data by forking multiple CARE-Loops with different versions of knowledge. This is like a time traversal to the future.

KIDS Tools Specifications

A KIDS tools set may not only help users in building KIDS applications, but also may specify various control aspects of the underlying infrastructure, i.e., evolution of knowledge based on user feedbacks and re-characterization of knowledge with new data.

KIDS Application Server

KIDS application servers may support the execution of KIDS applications, using the KIDS data, knowledge, and process model stored in the database. KIDS application servers may channel information for unambiguous provenance and delegate the state management and event processing to the database.

KIDS Optimization

KIDS databases may designed to support the ACID properties of transactions; the collection of facts requires full or reduced durability, and therefore, needs a database service that has all the support for data models and types, as well as security, compression, compaction, time travel, provenance, and so forth. The durability must be controlled by user requirement, such as all, >x % of data, and sufficient to answer provenance question with a high enough accuracy. Furthermore, this service has to support high performance classification. The ACID requirements may be relax to significantly reduce resource consumption. One may contemplate a specialized database for this purpose, but it may the functionalities for the full range of requirements. Therefore, certain approaches may include optimizing an existing database for evolving patterns and leverage hardware acceleration.

KIDS Support for Distributed Processing

In some embodiments, KIDS may work in distributed environments to leverage the underlying infrastructure.

Integration with Social Networking and Personalization

In some embodiments, social networking may be an integral part of KIDS.

Personalization is of special interest, whereby any knowledge may be done based on the preferences of groups and individuals. For example, the patient care example use cases show the importance of personalization.

KIDS Migration

Regarding migration support, existing applications may keep running for the existing functionality, but may create a 'shadow' application based on the KIDS model. The shadow observes the data in existing system, sometimes by crawling. However, new functionalities as well as some of the existing technology may be implemented in KIDS

What is claimed is:

1. A method of performing data transformation processes within multi-temporal databases, the method comprising:
    invoking, at a computer system, a first data transformation process on one or more data objects within a multi-temporal database;
    in response to invoking the first data transformation process:
        (a) determining, by the computer system, a first time associated with the first data transformation process;
        (b) performing, by the computer system, a first execution of a first query configured to compute a result based on a first set of multi-temporal data items stored within the multi-temporal database; and
        (c) storing, by the computer system, (i) data corresponding to the first set of multi-temporal data items, (ii) a first result of the execution of the first query, and (iii) the first time associated with the first data transformation process;
    receiving, at the computer system, a plurality of data updates for data stored in a multi-temporal database;
    determining, by the computer system, a valid time for each of the plurality of received data updates;

updating, in the multi-temporal database, one or more multi-temporal data items based on the received data updates, wherein updating the multi-temporal data items includes storing the determined valid time and a separate transaction time for each of the one or more received data updates;

in response to receiving the plurality of data updates, determining whether the plurality of data updates change any of the first set of multi-temporal data items within the multi-temporal database; and in response to determining that the plurality of data updates have changed one or more of the first set of multi-temporal data items within the multi-temporal database:
  (a) performing, by the computer system, a second execution of the first query to compute a second result, wherein the second execution of the first query uses multi-temporal data corresponding to a current time and including the one or more changed first set of multi-temporal data items;
  (b) determining a difference value between a second result of the second execution of the first query using the multi-temporal data corresponding to the current time, and the first result of the first execution of the first query using the multi-temporal data corresponding to the first time associated with the first data transformation process;
  (c) comparing the difference value to a predetermined threshold value, the predetermined threshold value determined based at least in part on a change in a value of one or more objects within the multi-temporal data, the predetermined threshold value used to determine a second invocation of the first data transformation process; and
  (d) in response to determining that the difference value is greater than the predetermined threshold value, performing the second invocation of the first data transformation process on the one or more data objects within the multi-temporal database.

2. The method of claim 1, wherein the first data transformation process is performed by a data transformation loop application executing within a compute node of a HADOOP data processing cluster.

3. The method of claim 2, wherein the first data transformation process includes one or more of a machine learning process, a classification of raw data process, a Support Vector Machine, Naive Bayes classifier, Neural Network, Clustering, Association Rule, Decision Tree, Univariate Seasonal and linear Trend, Multivariate State Estimation Technique, Cognitive computing, Bayesian Belief Network, Least-Squares Optimization or Regression of solutions for inverse problem, Influence Diagrams, Dempster-Shafer theory, Decision Trees, Prognosis of Remaining Useful Life, script, plan, schedule, BPEL workflow, and business process in BPMN.

4. The method of claim 1, further comprising: storing a second data object corresponding to the result of the second invocation of the first data transformation process;
  determining a difference value between the second data object and a different data object of the same type as the second data object, wherein the different data object was generated by the first invocation of the data transformation process; and
  invoking a second data transformation process on the second data object based on a determination that the difference value between second data object and the different data object is greater than a second predetermined threshold value.

5. The method of claim 4, wherein the first data transformation process and second data transformation process are part of a continuous data transformation loop application, the method further comprising:
  receiving one or more additional updates for the multi-temporal data stored in the computer system;
  updating the one or more multi-temporal data items based on the received additional updates;
  performing a third execution of the first query using the additional updates for the multi-temporal data;
  performing a fourth execution of the first query using multi-temporal data corresponding to a previous execution time of the data transformation process;
  determining a difference value between a result of the third execution of the first query and a result of the fourth execution of the first query;
  comparing the difference value to the predetermined threshold value; and
  upon determining that the difference value is greater than the predetermined threshold value, re-invoking the data transformation process.

6. The method of claim 1, wherein performing the first and second execution of the first query, and comparing the difference value between first and second execution of the first query to the predetermined threshold value are performed outside of and asynchronously from a first transaction performing the updating of the one or more multi-temporal data items, and wherein the first and second invocations of the first data transformation process are performed outside of and asynchronously from the first transaction.

7. The method of claim 1, wherein determining the valid time for the received data updates comprises receiving the valid time within each of the plurality of received data updates.

8. The method of claim 1, wherein determining the valid time for the received data updates comprises dynamically determining the valid time for each of the plurality of received data updates using an orchestration engine of the computer system.

9. The method of claim 1, further comprising: after invoking the first data transformation process, receiving a request to determine a set of data updates causing the first data transformation process;
  in response to the request, retrieving a plurality of multi-temporal data items from the computer system, including the first set of multi-temporal data items;
  determining which of the plurality of multi-temporal data items caused the first data transformation process, wherein said determining is based on the valid times and the separate transaction times for the retrieved plurality of multi-temporal data items; and
  transmitting a response to the received request, including data identifying the determined multi-temporal data items that caused the first data transformation process.

10. The method of claim 9, wherein determining which of the plurality of multi temporal data items caused the second invocation of the first data transformation process comprises:
  determining that a first updated data item within the plurality of multi-temporal data items has a valid time prior to the second invocation of the first data transformation process, and a transaction time after the second invocation of the first data transformation process; and determining that the first updated data item is not within the set of data updates that caused the second invocation of the first data transformation process, based on the determination that the transaction time of the first updated data item is after the second invocation of the first data transformation process.

11. The method of claim 9, wherein determining which of the plurality of multi-temporal data items caused the second invocation of the first data transformation process comprises:

determining that a first updated data item within the plurality of multi-temporal data items has a valid time after the second invocation of the first data transformation process; and determining that the first updated data item is not within the set of data updates that caused the second invocation of the first data transformation process, based on the determination that the valid time of the first updated data item is after the second invocation of the first data transformation process.

12. The method of claim 1, further comprising determining that the first query is configured to compute a result based on the first set of multi-temporal data items that includes at least some of the updated multi-temporal data items, by determining that the received data updates definitively change the result of the first query.

13. The method of claim 1, further comprising determining that the first query is configured to compute a result based on the first set of multi-temporal data items that includes at least some of the updated multi-temporal data items, by determining that the received data updates potentially but not definitively change the result of the first query.

14. A system comprising:

a processing unit comprising one or more processors; and memory coupled with and readable by the processing unit and storing therein a set of instructions which, when executed by the processing unit, causes the processing unit to:

invoke a first data transformation process on one or more data objects within a multi-temporal database;

in response to invoking the first data transformation process:

(a) determine a first time associated with the first data transformation process;

(b) perform a first execution of a first query configured to compute a result based on a first set of multi-temporal data items stored within the multi-temporal database; and (c) store (i) data corresponding to the first set of multi-temporal data items, (ii) a first result of the execution of the first query, and (iii) the first time associated with the first data transformation process;

receive a plurality of data updates for data stored in a multi-temporal database;

determine a valid time for each of the plurality of received data updates;

update, in the multi-temporal database, one or more multi-temporal data items based on the received data updates, wherein updating the multi-temporal data items includes storing the determined valid time and a separate transaction time for each of the one or more received data updates;

in response to receiving the plurality of data updates, determine whether the plurality of data updates change any of the first set of multi-temporal data items within the multi-temporal database; and in response to determining, that the plurality of data updates have changed one or more of the first set of multi-temporal data items within the multi-temporal database: '(a) perform a second execution of the first query to compute a second result, wherein the second execution of the first query uses multi-temporal data corresponding to a current time and including the one or more changed first set of multi-temporal data items;

(b) determine a difference value between a second result of the second execution of the first query using the multi-temporal data corresponding to the current time, and the first result of the first execution of the first query using the multi-temporal data corresponding to the first time associated with the first data transformation process;

(c) compare the difference value to a predetermined threshold value, the predetermined threshold value determined based at least in part on a change in a value of one or more objects within the multi-temporal data, the predetermined threshold value used to determine a second invocation of the first data transformation process; and (d) in response to determining that the difference value is greater than the predetermined threshold value, performing the second invocation of the first data transformation process on the one or more data objects within the multi-temporal database.

15. The system of claim 14, wherein the first and second invocations of the first data transformation process are performed by a data transformation loop application executing within a compute node of a HADOOP data processing cluster.

16. The system of claim 15, wherein the first data transformation process includes one or more of a machine learning process, a classification of raw data process, Support Vector Machine, Naive Bayes classifier, Neural Network, Clustering, Association Rule, Decision Tree, Univariate Seasonal and linear Trend, Multivariate State Estimation Technique, Cognitive computing, Bayesian Belief Network, Least-Squares Optimization or Regression of solutions for inverse problem, Influence Diagrams, Dempster-Shafer theory, Decision Trees, Prognosis of Remaining Useful Life, script, plan, schedule, BPEL workflow, and business process in BPMN.

17. The system of claim 14, the memory storing therein further instructions which, when executed by the processing unit, causes the processing unit to:

store a second data object corresponding to the result of the second data transformation process;

determine a difference value between the second data object and a different data object of the same type as the second data object, wherein the different data object was generated by the first invocation of the data transformation process; and invoke a second data transformation process on the second data object based on a determination that the difference value between second data object and the different data object is greater than a second predetermined threshold value.

18. The system of claim 17, wherein the first data transformation process and second data transformation process are part of a continuous data transformation loop application, and wherein the memory stores therein further instructions which, when executed by the processing unit, causes the processing unit to:
    receive one or more additional updates for the multi-temporal data stored in the computer system;
    update the one or more multi-temporal data items based on the received additional updates;
    perform a third execution of the first query using the additional updates for the multi-temporal data;
    perform a fourth execution of the first query using multi-temporal data corresponding to a previous execution time of the data transformation process;
    determine a difference value between a result of the third execution of the first query and a result of the fourth execution of the first query;
    comparing the difference value to the predetermined threshold value; and
    upon determining that the difference value is greater than the predetermined threshold value, re-invoke the data transformation process.

19. The system of claim 14, wherein performing the first and second execution of the first query, and comparing the difference value between first and second execution of the first query to the predetermined threshold value are performed outside of and asynchronously from a first transaction performing the updating of the one or more multi-temporal data items, and wherein the first and second invocations of the first data transformation process are performed outside of and asynchronously from the first transaction.

20. A non-transitory computer-readable memory comprising a set of computer-executable instructions stored therein which, when executed by a processor, causes the processor to:
    invoke a first data transformation process on one or more data objects within a multi-temporal database;
    in response to invoking the first data transformation process:
        (a) determine a first time associated with the first data transformation process;
        (b) perform a first execution of a first query configured to compute a result based on a first set of multi-temporal data items stored within the multi-temporal database; and
        (c) store (i) data corresponding to the first set of multi-temporal data items, (ii) a first result of the execution of the first query, and (iii) the first time associated with the first data transformation process;
    receive a plurality of data updates for data stored in a multi-temporal database;
    determine a valid time for each of the plurality of received data updates;
    update, in the multi-temporal database, one or more multi-temporal data items based on the received data updates, wherein updating the multi-temporal data items includes storing the determined valid time and a separate transaction time for each of the one or more received data updates;
    in response to receiving the plurality of data updates, determine whether the plurality of data updates change any of the first set of multi-temporal data items within the multi-temporal database; and
    in response to determining, that the plurality of data updates have changed one or more of the first set of multi-temporal data items within the multi-temporal database:
        (a) perform a second execution of the first query to compute a second result, wherein the second execution of the first query uses multi-temporal data corresponding to a current time and including the one or more changed first set of multi-temporal data items;
        (b) determine a difference value between a second result of the second execution of the first query using the multi-temporal data corresponding to the current time, and the first result of the first execution of the first query using the multi-temporal data corresponding to the first time associated with the first data transformation process;
        (c) compare the difference value to a predetermined threshold value, the predetermined threshold value determined based at least in part on a change in a value of one or more objects within the multi-temporal data, the predetermined threshold value used to determine a second invocation of the first data transformation process; and
        (d) in response to determining that the difference value is greater than the predetermined threshold value, performing the second invocation of the first data transformation process on the one or more data objects within the multi-temporal database.

\* \* \* \* \*

UNITED STATES PATENT AND TRADEMARK OFFICE
CERTIFICATE OF CORRECTION

PATENT NO. : 10,740,358 B2
APPLICATION NO. : 14/665171
DATED : August 11, 2020
INVENTOR(S) : Chan et al.

It is certified that error appears in the above-identified patent and that said Letters Patent is hereby corrected as shown below:

On the Title Page

On page 3, Column 1, Item (56) under Other Publications, Line 1, delete "Perdue Univertisy," and insert -- Purdue University, --, therefor.

In the Specification

In Column 44, Line 44, delete "KIDS" and insert -- KIDS. --, therefor.

In the Claims

In Column 46, Line 62, in Claim 10, delete "multi temporal" and insert -- multi-temporal --, therefor.

In Column 48, Line 8, in Claim 14, delete "database: '" and insert -- database: --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*